United States Patent
Nachimuthu et al.

(10) Patent No.: US 9,606,788 B2
(45) Date of Patent: Mar. 28, 2017

(54) DYNAMIC UPDATE INSTALLER FOR CUSTOMIZED SOFTWARE

(71) Applicant: Microsoft Technology Licensing, LLC, Redmond, WA (US)

(72) Inventors: Arunpriyaa Nachimuthu, Bellevue, WA (US); Satish J. Thomas, Sammamish, WA (US); Amit Gupta, Redmond, WA (US); Nathan S. Premo, Bellevue, WA (US); Dmitry Gorn, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/456,679

(22) Filed: Aug. 11, 2014

(65) Prior Publication Data

US 2015/0317147 A1 Nov. 5, 2015

Related U.S. Application Data

(60) Provisional application No. 61/986,488, filed on Apr. 30, 2014.

(51) Int. Cl.
*G06F 9/44* (2006.01)
*G06F 9/445* (2006.01)

(52) U.S. Cl.
CPC ..................... *G06F 8/65* (2013.01)

(58) Field of Classification Search
CPC .......................................... G06F 8/65
USPC .............................. 717/168–178
See application file for complete search history.

(56) References Cited

U.S. PATENT DOCUMENTS

| | | | | |
|---|---|---|---|---|
| 5,867,709 | A | * | 2/1999 | Klencke .............. G06F 9/44505 717/108 |
| 6,151,643 | A | * | 11/2000 | Cheng et al. ................... 710/36 |
| 6,282,709 | B1 | * | 8/2001 | Reha ........................ G06F 8/65 717/175 |
| 7,251,812 | B1 | | 7/2007 | Jhanwar et al. |
| 7,370,043 | B1 | * | 5/2008 | Shelton et al. ............... 707/690 |
| 7,496,910 | B2 | | 2/2009 | Voskuil |
| 7,614,046 | B2 | | 11/2009 | Daniels et al. |

(Continued)

FOREIGN PATENT DOCUMENTS

| | | |
|---|---|---|
| EP | 2482572 A1 | 8/2012 |
| WO | 2005033934 A2 | 4/2005 |

OTHER PUBLICATIONS

"Lifecycle Services for Microsoft Dyna s User Guide (LCS) [AX 2012]", Published on: Aug. 8, 2013 Available at: http://technet.microsoft.com/en-us/library/dn268616.aspx.

(Continued)

*Primary Examiner* — Qing Chen
(74) *Attorney, Agent, or Firm* — Christopher J. Volkmann; Kelly, Holt & Christenson, PLLC

(57) ABSTRACT

A computer-implemented method of updating a system of customized software is provided. The method includes receiving an update request and collecting contextual information relative to the system of customized software. A query is generated for updates applicable to the system of customized software based on the contextual information. A query response is received indicative of at least one applicable update. A selection relative to the at least one applicable update is received. At least one update is selectively applied based on the selection.

16 Claims, 34 Drawing Sheets

(56) References Cited

U.S. PATENT DOCUMENTS

| | | |
|---|---|---|
| 8,074,213 B1 | 12/2011 | Holtz |
| 8,516,471 B2 | 8/2013 | Bhakta et al. |
| 8,539,477 B2 | 9/2013 | Balascio et al. |
| 8,701,102 B2 | 4/2014 | Appiah et al. |
| 8,918,709 B2 | 12/2014 | Oleksy et al. |
| 2003/0182414 A1 | 9/2003 | O'Neill |
| 2004/0040021 A1* | 2/2004 | Bharati et al. .............. 717/170 |
| 2004/0168165 A1* | 8/2004 | Kokkinen ................. 717/168 |
| 2004/0210752 A1* | 10/2004 | Rao ...................... G06F 8/65 713/2 |
| 2005/0114625 A1* | 5/2005 | Snyder ................. H04L 41/08 712/1 |
| 2005/0144616 A1* | 6/2005 | Hammond et al. .......... 717/173 |
| 2006/0058009 A1* | 3/2006 | Vogedes et al. ........... 455/412.1 |
| 2006/0200477 A1* | 9/2006 | Barrenechea ..... G06F 17/30595 |
| 2009/0300596 A1* | 12/2009 | Tyhurst et al. ............. 717/173 |
| 2010/0251206 A1* | 9/2010 | Horiuchi ......... G06F 17/30168 717/103 |
| 2010/0251230 A1 | 9/2010 | O'Farrell et al. |
| 2011/0321029 A1 | 12/2011 | Kern et al. |
| 2012/0150548 A1 | 6/2012 | Rajagopalan et al. |
| 2014/0359593 A1* | 12/2014 | Cohen et al. ................ 717/169 |
| 2015/0081572 A1 | 3/2015 | Thomas et al. |
| 2015/0082291 A1* | 3/2015 | Thomas ................. G06F 8/65 717/168 |
| 2015/0082292 A1* | 3/2015 | Thomas ................. G06F 8/65 717/168 |
| 2015/0082293 A1* | 3/2015 | Thomas ................. G06F 8/65 717/168 |
| 2015/0082296 A1* | 3/2015 | Thomas ................. G06F 8/65 717/171 |

OTHER PUBLICATIONS

"Determining Costs and Impact of a Software Upgrade Across Different Business Units", Published on: Feb. 12, 2013 Available at: http://www.geneca.com/case-studies/determining-costs-impact-software-upgrade-business-units/.

"Cloud ERP—New Dog, Same Fleas", Published on: May 22, 2011 Available at: http://gbeaubouef.wordpress.com/2011/05/22/cloud-erp/.

U.S. Appl. No. 14/151,289, Srinivasan, et al., "Automatic Installation of Selected Updates in Multiple Environments", filed Jan. 9, 2014.

U.S. Appl. No. 14/151,306, Srinivasan, et al., "Update Installer with Technical Impact Analysis", filed Jan. 9, 2014.

U.S. Appl. No. 61/902,093, Basu, et al., "Automatically resolving conflicts, recommending fixes and reporting an update state of a business system", filed Nov. 8, 2013.

U.S. Appl. No. 61/877,856, Basu, et al., "User Experience for Updating a Complex Software System", filed Sep. 13, 2013.

International Search Report and Written Opinion for International Application No. PCT/US2015/027409, date of mailing: Jul. 22, 2015, date of filing: Apr. 24, 2015, 13 pages.

Second Written Opinion for International Patent Application No. PCT/US2015/027409, date of mailing: Mar. 18, 2016, date of filing: Apr. 24, 2015, 8 pages.

International Preliminary Report on Patentability for International Patent Application No. PCT/US2015/027409, date of mailing: Jun. 16, 2016, date of filing: Apr. 24, 2015, 9 pages.

* cited by examiner

ACME UPDATE INSTALLER

Software license terms
To continue, you must accept the following license terms.

- Welcome
- Software license terms
- Download and install updates
- Download progress
- Select update type
- Configure model store updates
  - Choose a model store
  - Select application updates
  - Review conflicts
  - Review updates
- Save updates
- Review components
- Installation progress
- Complete

ACME PRE-RELEASE SOFTWARE LICENSE TERMS

ACME Corporation (or based on where you live, one of its affiliates) license this pre-release version of the ACME AX Update Installer to you. You may use the ACME AX Update Installer with each validly licensed copy of the ACME AX Update Installer 2012 RC Community Technical Preview (the software). You may not use it if you do not have a license for the software. The license terms for the software apply to your use of the pre-release version of ACME AX Update Installer. To read the license terms, go to the "Help" menu in the software.

Software updates that you receive through the pre-license version of the ACME AX Update Installer are governed by any license terms that come with the updates. If no license terms come with the updates, they may be governed by the original license agreement for the software that they update. You should check that license agreement for details. If you choose to receive updates automatically, you won't receive this notice again or be notified of which software is being updated, but you can review your update history at any time by going to the "Help" menu or the "Add/Remove Programs" feature in the ACME AX 2012 R3 Community Technical Preview.

TheACME AX privacy statement (http://go.acme.com/....) will apply to updates that you receive through the pre-release version of ACME AX Update Installer. The ACME Lifecycle Service privacy statement (http://....) applies to your use of the Lifecycle Services.

[< Back] [Print...] [Accept and continue] [Cancel]

FIG. 7

ACME UPDATE INSTALLER

Select update type
Select binary or application updates or both. It is highly recommended that you choose both.

Welcome
Software license terms
Download and install updates
Download progress
Select update type
Configure model store updates
  Choose a model store
  Select application updates
  Review conflicts
  Review updates
Save updates
Review components
Installation progress
Complete ☑ Binary updates ☑ Application updates < Back    Next >    Cancel

FIG. 12

ACME UPDATE INSTALLER

△ ACME

Select application updates
Select application updates by priority, number of conflicts, module, license code or business process.

Welcome
Software license terms
Download and install updates
Download progress
Select update type
Configure model store updates
  Choose a model store
  Select application updates
  Review conflicts
  Review updates
Save updates
Review components
Installation progress
Complete Select application updates ● All updates
○ Applicable updates Fix type
[All ▼]

Module
[All ▼]

License code
[All ▼]

Region/County
[All ▼]

Business process (Lifecycle Services)
[ ▼]

Search [           ]

Group by [Fix type ▼]

☐ Select all
  ☐ – ☑ Major feature updates (1)
       ☑ AD323SDJ: Test 12 for Dependency Tool
  ☐ + ☑ Optional fixes (17)

Details | Conflicts

[< Back] [Next >] [Cancel]

FIG. 14

ACME UPDATE INSTALLER

Select application updates
Select application updates by priority, number of conflicts, module, license code or business process.

⚠ ACME

Welcome
Software license terms
Download and install updates
Download progress
Select update type
Configure model store updates
   Choose a model store
   Select application updates
   Review conflicts
   Review updates
Save updates
Review components
Installation progress
Complete Select application updates Search ● All updates
○ Applicable updates Fix type
[ All ▼ ]

Module
[ All ▼ ]

License code
[ All ▼ ]

Region/County
[ All ▼ ]

Business process (Lifecycle Services)
[ ▼ ]

Group by [ Fix type ▼ ]

☐ Optional fixes (17)
☑ AD323S01: Test 12 for Dep...
☑ AD323S02: Test 12 for Dep...
☑ AD323S03: Test 12 for Dep...
☑ AD323S04: Test 12 for Dep...
☑ AD323S05: Test 12 for Dep...
☑ AD323S06: Test 12 for Dep...
☑ AD323S07: Test 12 for Dep...
☑ AD323S08: Test 12 for Dep...
☑ AD323S09: Test 12 for Dep...
☑ AD323S10: Test 12 for Dep...

| Details | Conflicts |

Conflict summary
Tables: 0
Classes: 1
Forms: 0
Reports: 0
Other: 0

[ Get conflict details ]

[ < Back ] [ Next > ]     [ Cancel ]

FIG. 15

ACME UPDATE INSTALLER

Software license terms
To continue, you must accept the following license terms.

- Welcome
- Software license terms
- Download and install updates
- Download progress
- Select update type
- Configure model store updates
  - Choose a model store
  - Select application updates
  - Review conflicts
  - Review updates
- Save updates
- Review components
- Installation progress
- Complete

ACME PRE-RELEASE SOFTWARE LICENSE TERMS

ACME Corporation (or based on where you live, one of its affiliates) license this pre-release version of the ACME AX Update Installer to you. You may use the ACME AX Update Installer with each validly licensed copy of the ACME AX Update Installer 2012 RC Community Technical Preview (the software). You may not use it if you do not have a license for the software. The license terms for the software apply to your use of the pre-release version of ACME AX Update Installer. To read the license terms, go to the "Help" menu in the software.

Software updates that you receive through the pre-release version of the ACME AX Update Installer are governed by any license terms that come with the updates. If no license terms come with the updates, they may be governed by the original license agreement for the software that they update. You should check that license agreement for details. If you choose to receive updates automatically, you won't receive this notice again or be notified of which software is being updated, but you can review your update history at any time by going to the "Help" menu or the "Add/Remove Programs" feature in the ACME AX 2012 R3 Community Technical Preview.

TheACME AX privacy statement (http://go.acme.com/...) will apply to updates that you receive through the pre-release version of ACME AX Update Installer. The ACME Lifecycle Service privacy statement (http://...) applies to your use of the Lifecycle Services.

[< Back] [Print...] [Accept and continue] [Cancel]

FIG. 21

DYNAMIC UPDATE INSTALLER FOR CUSTOMIZED SOFTWARE

CROSS-REFERENCE TO RELATED APPLICATIONS

The present application is based on and claims the benefit of U.S. provisional patent application Ser. No. 61/986,488, filed Apr. 30, 2014, the content of which is hereby incorporated by reference in its entirety.

BACKGROUND

Computer systems are currently in wide use. Some such systems are customized (some significantly) before they are deployed at an end user's site. Such systems often also have updates which can be installed.

By way of example, some such computer systems include business systems, such as customer relations management (CRM) systems, enterprise resource planning (ERP) systems, line-of-business (LOB) systems, etc. In these types of systems, a general business system is first purchased by a user, or customer, and the user or customer often makes customizations, extensions or other modifications to that general business system, in order to obtain their own customized deployment.

Such systems often have updates published for them. The updates can include new releases, as well as bug fixes. For instance, when new releases of the business system are generated, they are often followed by a number of bug fixes for problems that were not fixed prior to release. The fixes are normally released, piecemeal, as they are generated. Periodically, however, a cumulative update package is released which includes all of the fixes generated, to that point. In the past, the cumulative update package was typically provided to the end-user in the form of fixed-media, such as on a CD-ROM. This cumulative update may, for example, include hundreds or even thousands of fixes and/or upgrades. In the case of a cumulative update, if the customer decides to defer installation of the update, the software system may lag behind by failing to leverage feature enhancements or performance optimizations that are part of the cumulative update.

Currently, users of customized software systems do not have an effective way to determine what critical updates are available at any given point. Thus, the users are limited in their ability to proactively obtain critical or even desirable updates as needed. Instead, such users await releases of fixed-media updates that may then be scheduled for deployment to the customized software system. Unlike an update to a desktop computer, these updates may affect tens or even hundreds of computers working together to provide an important function for an enterprise.

The discussion above is merely provided for general background information and is not intended to be used as an aid in determining the scope of the claimed subject matter.

SUMMARY

A computer-implemented method of updating a system of customized software is provided. The method includes receiving an update request and collecting contextual information relative to the system of customized software. A query is generated for updates applicable to the system of customized software based on the contextual information. A query response is received indicative of at least one applicable update. A selection relative to the at least one applicable update is received. At least one update is selectively applied based on the selection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
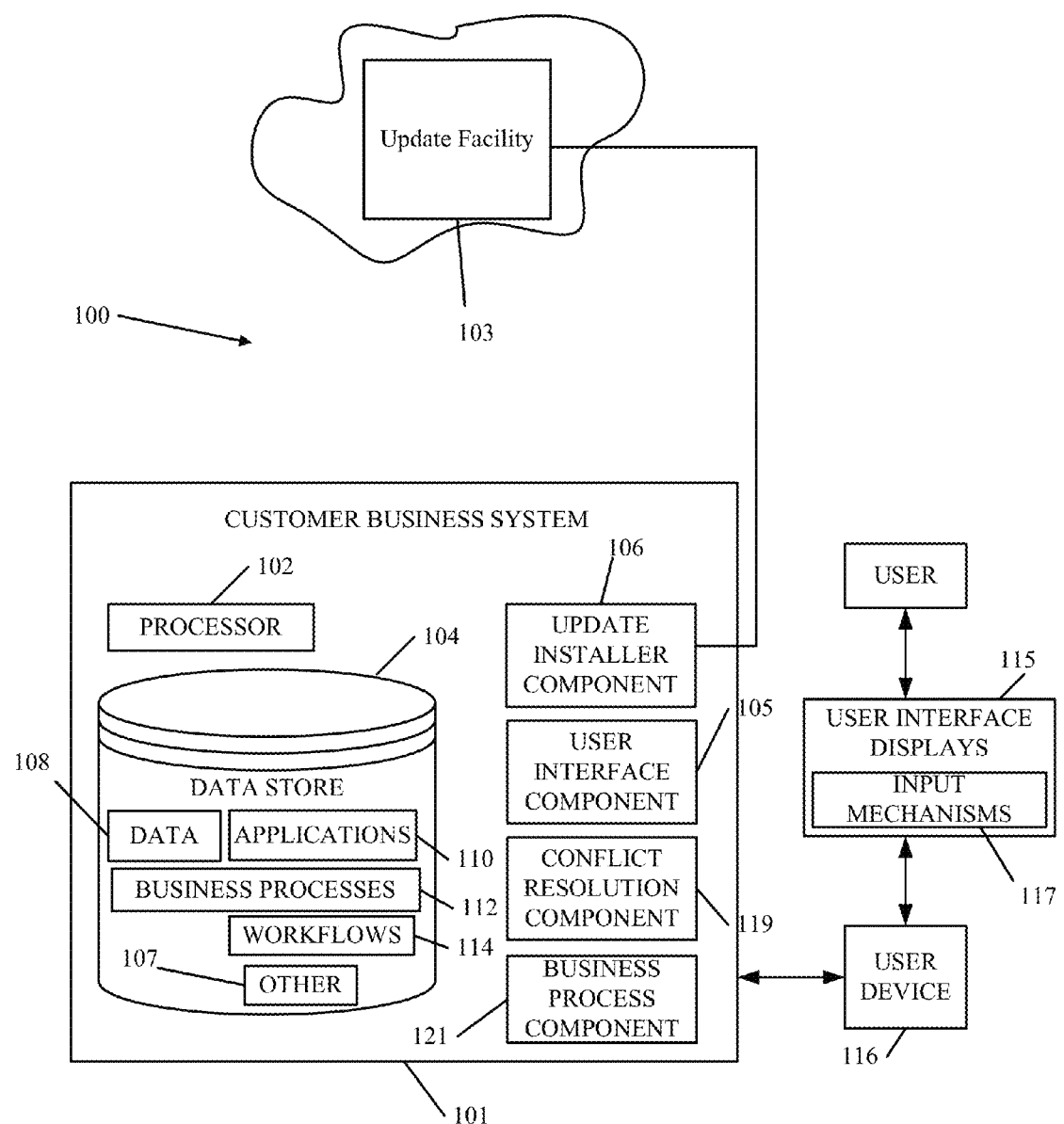
FIG. 1 is a block diagram of one exemplary update architecture.

FIG. 1 shows a block diagram of one exemplary architecture in which embodiments described herein are useful. Architecture 100 includes customer business system 101 (which can be an on premise system, a cloud-based system, or another system Architecture 100 also illustratively includes cloud-based update facility 103. Business system 101 can be accessed by a user through user interfaces 115 generated either by business system 101 or by user device 116. In one embodiment, user interfaces 115 have user input mechanisms 117 that can be actuated by user 114 in order to manipulate business system 101.

Customer business system 101 illustratively includes processor 102, data store 104, user interface component 105, update installer component 106, conflict resolution component 119 and business process component 121. Data store 104 illustratively includes data 108, applications 110, information that describes business processes 112, information that describes workflows 114, and other items 107. In one embodiment, applications 110 include the business logic used to run business processes 112 and workflows 114 in business system 101. Applications 110 illustratively operate on data 108, which can include entities that represent items in the business system 101. Thus, applications 110 can include a general ledger application, inventory application, applications that allow a user to track business opportunities, track sales or production in a business system, or a wide variety of other business applications. The entities, for instance, include customer entities that represent customers, opportunity entities that represent business opportunities, inventory entities that represent inventory items, quote and proposal entities that represent quotes and proposals, etc. The data 108 can include a wide variety of other entities and data, and those mentioned above are mentioned for the sake of example only. The user can illustratively access customer business system 101 in order to perform activities, tasks, workflows, et cetera that are done in carrying out the business of the organization that employs business system 101.

Business system 101 is provided as one example of an environment in which customized software is employed. However, many types of software are shipped to a customer in a first state and then later customized in order to fully meet the needs of the customer. The customization can be considered as a spectrum. On one side of the spectrum is software that is vastly customized or even further developed before deployment. On the other side of the customization spectrum is software that is operated in the condition in which it ships. Since customizations, by definition, introduce changes that depart from the as-shipped versions, updates to such customized software have typically required significant care and time in order to ensure that any customizations are not rendered inoperable or unstable by virtue of the update.

Figure 2:
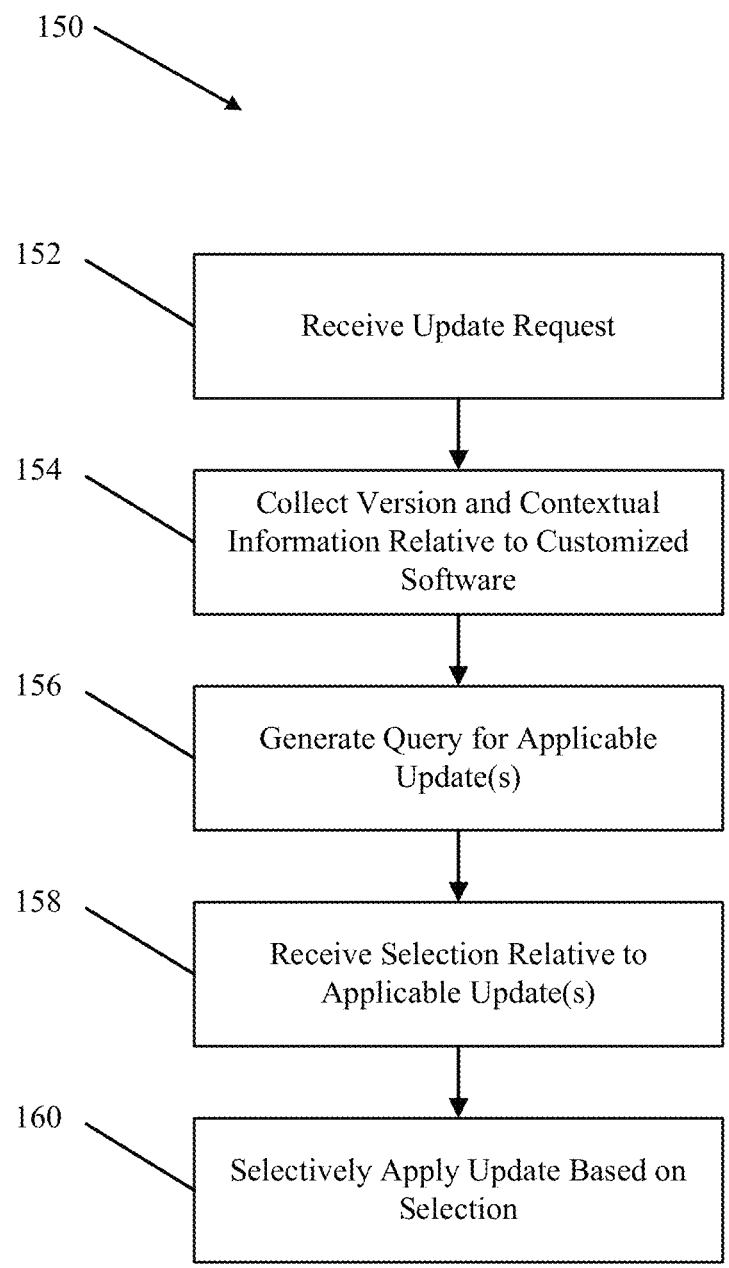
FIG. 2 is a flow diagram illustrating one embodiment of operation of the architecture shown in FIG. 1 generating a dynamic update for customized software.

FIG. 2 is a flow diagram of a method of updating customized software in accordance with an embodiment. Method 150 begins at block 152 where a request to update the customized software system is received. The user may request the update for any number of reasons. For example, the user may wish to simply update business system 101 as part of a routine update process. In another example, the user may wish to update any or all portions of business system 101 in order to remedy a problem the user is experiencing. In still another example, the user may wish to update any or all portions of business system 101 in order to take advantage of new features provided by the updates. Essentially, the user may wish to update at any time for any of a variety of reasons. Previously, a user of customized software would need to wait until an update was provided on fixed media. Now, a user may begin the update process at his/her convenience for any number of reasons.

Such user initiated updates need not be synchronized with any update or release schedule set forth by the software provider. Such asynchronous updating can be beneficial to users, for example, in situations where the software provider releases updates according to a schedule, which may or may not be periodic, and may be dependent on factors that are not relevant to a particular user of business systems such as business system 101. In this regard, the system or software updating process described herein can be temporally disjointed from the software provider's release schedule, allowing for software updating to be made independent of the software provider's release schedule. Additionally, operation of the customized computing system, itself, is improved since asynchronous updates can be performed to enhance functionality more frequently or in response to specific issues than would be available via a software manufacturer's update schedule.

In response to the update request, processor 102 causes update installer component 106 to collect version and contextual information relative to the customized software. Version information indicates the current version of the various modules and applications currently deployed in the customized software. Contextual information can be specific to individual components within business system 101 or it can be applicable to broader groupings of components. Contextual information can include business processes and/or configuration keys. Moreover, contextual information may also include information about the hardware upon which the customized software operates. Further, contextual information can include locality information (such as country and/or state) in order to facilitate compliance with local regulations or laws. Additionally, contextual information can include information about the customizations that have been made to business system 101. Further still, contextual information can include error frequency, support request frequency, or any other information that may help identify applicable updates.

At block 156, processor 102 causes update installer component 106 to generate a query to cloud-based update facility 103 based on the version information and the contextual information. Update facility 103 receives and processes the query and responds to update installer component 106 with a response indicative of applicable updates. As used herein, applicable updates are updates which are appropriate for business system 101 based on the contextual information and which have a newer version than the version information collected by update component 106 in block 154. Such applicable updates may be critical updates, suggested updates, optional updates or updates of other levels of importance. The applicable updates are displayed to the user via user interface 115. The user interface can facilitate user review of the applicable updates. For example, the updates may be filtered and/or grouped according to one or more criteria, such as country, module, business process, and configuration keys. At block 158 business system 101 receives a selection relative to one or more applicable updates. The selection may indicate that all, some, or none of the applicable updates will be applied. At block 160, installer component selectively obtains any selected updates from update facility 103 and applies the applicable updates based on the selection received at block 158.

The embodiment described above generally includes a system of custom software (business system 101) interacting with update facility 103 to identify and obtain applicable updates. However, a recent innovation in business systems can be leveraged to improve the update process further. The innovation, referred to herein as a life cycle system, provides improved interaction between users, technicians and developers of custom software systems.

Figure 3:
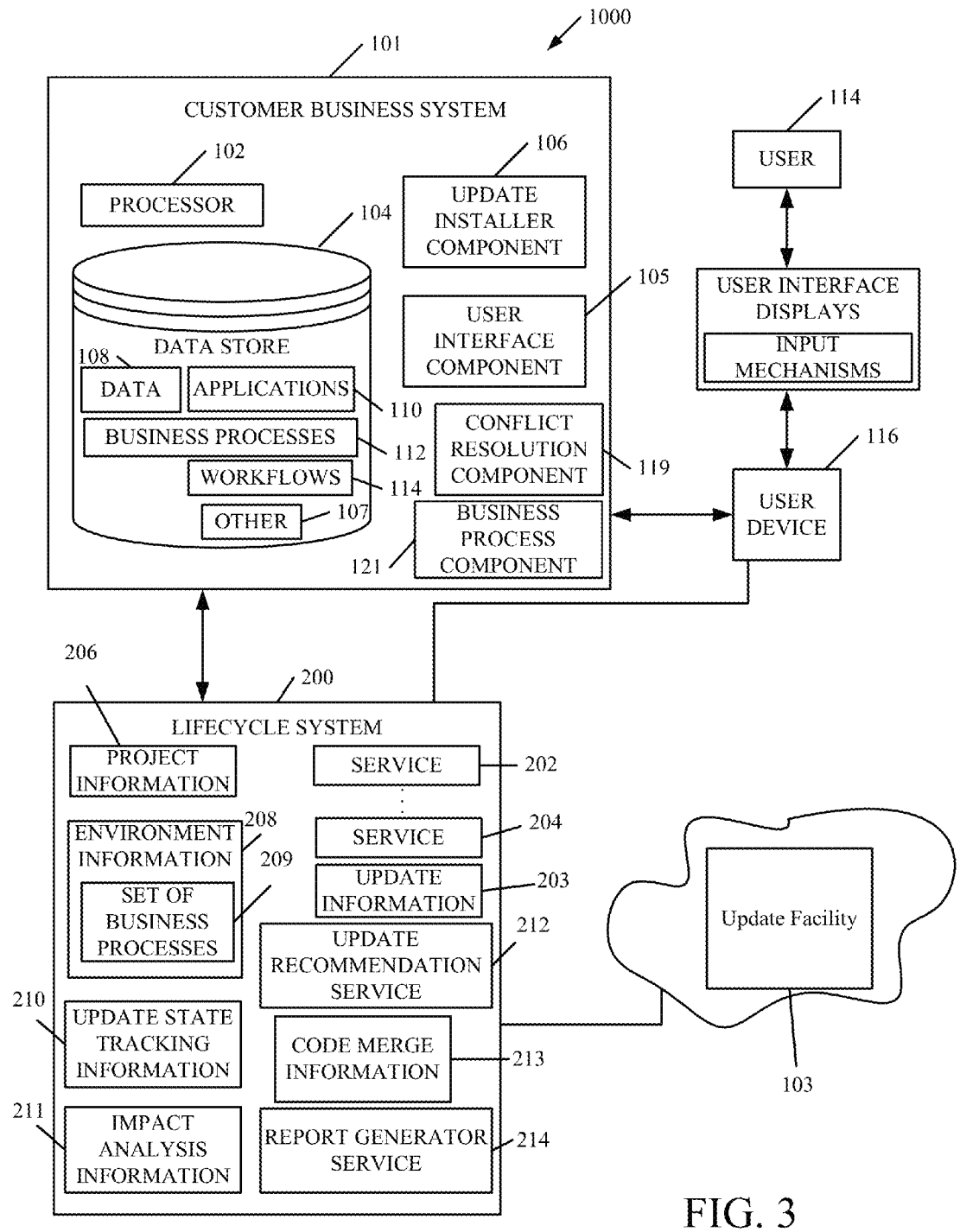
FIG. 3 is a block diagram of another exemplary update architecture leveraging a life cycle system in accordance with an embodiment.

FIG. 3 is a block diagram of another exemplary update architecture leveraging a life cycle system in accordance with an embodiment. Environment 1000 bears some similarities to environment 100 and like components are numbered similarly. Life cycle system 200 illustratively includes project information 206, environment information 208 (which can include information representative of a set of business processes 209 that are used by the user in customer business system 101), update state tracking information 210, services 202-204, update information 203, update recommendation service 212 and report generator service 214. Services 202-204 can be used by various persons in order to identify, track and resolve issues that arise during various life cycle stages of a project (e.g., from presale to implementation and maintenance). For instance, as business system 101 is designed, built, deployed and tested, the various services 202-204 illustratively allow the developers as well as the user organization to track issues which arise, and to determine whether the user's expectations are met when the final instance of business system 101 is deployed at the organization.

A user can illustratively log in to life cycle system 200 to view the various information provided by services 202-204. In one embodiment, for instance, services 202-204 include a service that allows a user to identify the needs of an organization and the basic functionality that is provided with a business system and generate a fit gap list that identifies the functionality or customizations that need to be made, to the business system, in order to meet the needs of the customer that is deploying the business system. The services also illustratively include a diagnostic service that allows life cycle system 200 to identify the particular environmental information that defines the environment of the deployed business system 101. For instance, the environmental data may identify the version number and identity of the operating system, the version number of the base system 101, the particular fixes that have been applied to system 101, the version number of the database and other application platforms used by business system 101, whether business system 101 is in a production environment, a test environment, a user acceptance testing environment, etc., and a wide variety of other information. As can be appreciated, the environmental data of life cycle system 200 can provide ample contextual information for dynamic updates.

A user can access life cycle system 200 to view project information 206 that defines the user's projects, environmental information 208 that includes the environmental data mentioned above, as well as an indication of the set of business processes 209 that are run on business system 101, update tracking information 210 that identifies the update state of business system 101 (for example, which updates have been applied and when), update information 203 that indicates detailed information corresponding to updates that have been installed, update recommendation service 212 that recommends updates for business system 101 based upon the information gathered from business system 101, and report generator service 214 that can be used to generate various reports that are discussed in greater detail below.

When a user wishes to update any or all of business system 101, the user can log in to life cycle system 200. Once logged in, the user can request an update. Upon such request, life cycle system 200 uses environmental information 208 gathered or otherwise determined relative to business system 101 to provide contextual information. Life cycle system 200 then generates and conveys a query to update facility 103 based on the contextual information. Update facility 103 responds to life cycle system 200 with a listing of applicable updates based on the query submitted by life cycle system 200. The listing of applicable updates is provided to the user to allow the user to select which updates the user wishes to apply. Once the applicable updates have been selected, the selected updates are downloaded and provided to update installer component 106 for installation. Update installer component 106 illustratively installs the selected updates, and can automatically resolve conflicts, when so commanded. The update state of customer business system 101 is illustratively uploaded to life cycle system 200 as update state tracking information 210. Thus, the user can also log on to life cycle system 200 in order to view the update state tracking information 210 and to receive recommended updates from update recommendation service 212, and to view various other information and reports as described in greater detail below.

Figure 4:
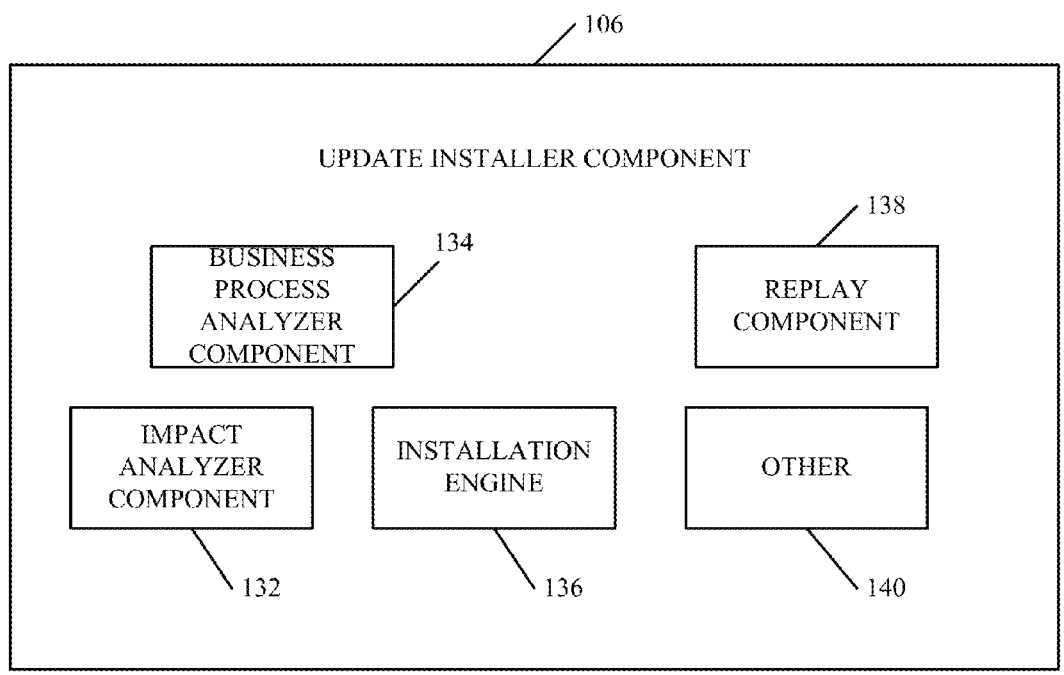
FIG. 4 shows one example of a more detailed block diagram of an update installer component.

FIG. 4 is a block diagram of one example of a more detailed embodiment of update installer component 106. FIG. 4 shows that update installer component 106 illustratively includes impact analyzer component 132, business process analyzer component 134, installation engine 136, and replay component 138. Update installer 106 can include other components 140 as well. Impact analyzer component 132 allows the user to see the impact of selected updates on objects and layers in business system 101, before they are applied. Business process analyzer component 134 allows the user to see the impact of selected updates on business processes in system 101, before they are applied. Installation engine 136 installs selected updates, and replay component 138 replays (or installs) the selected updates in other environments.

Figure 5:
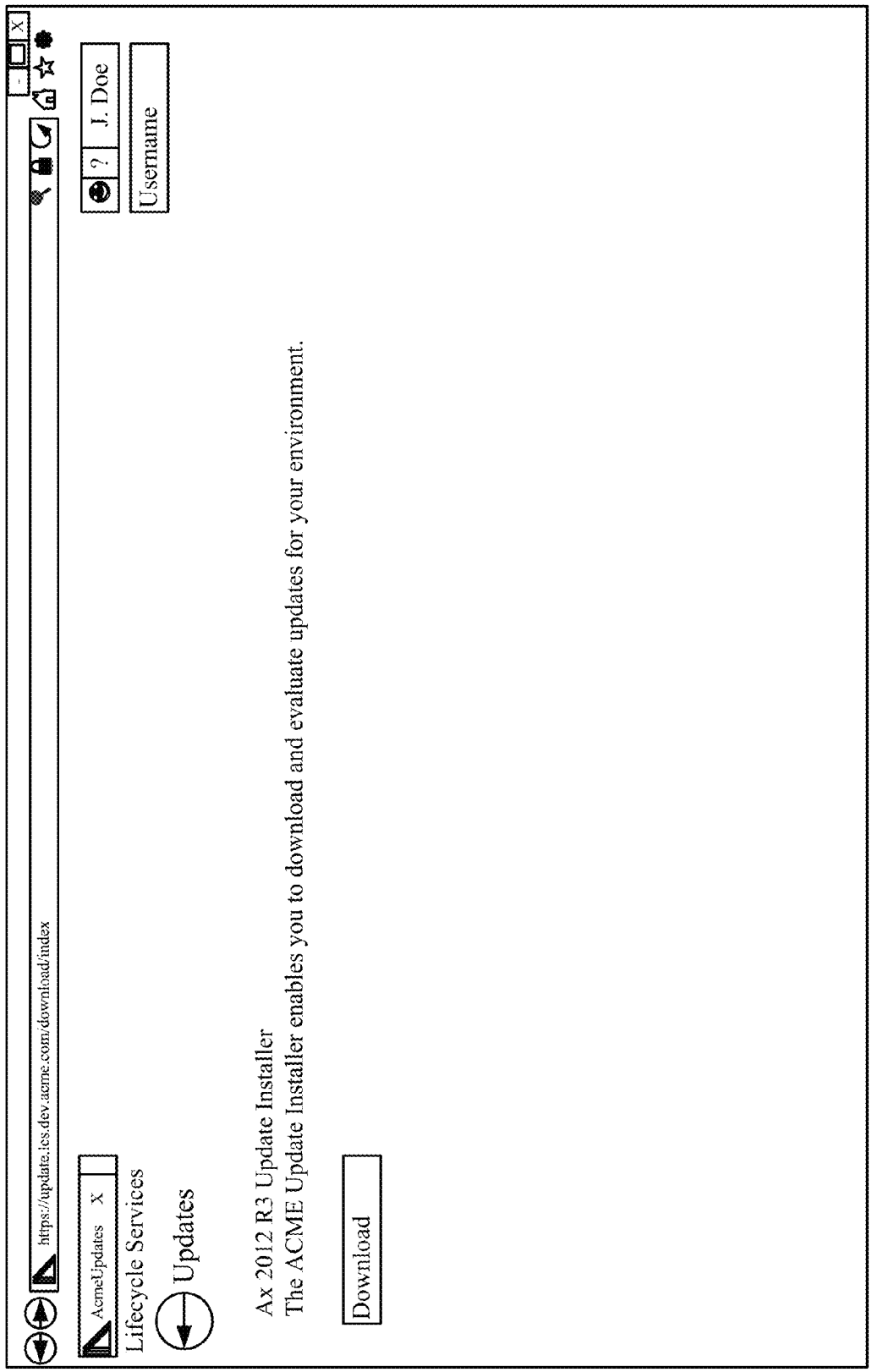
FIG. 5, are screenshots of illustrative user interfaces.

FIGS. 5-27 show screenshots of exemplary user interfaces provided during the update process according to one embodiment. One or more of the user interfaces may be provided by update installer component 106. FIG. 5 shows a screenshot of one example of a user interface providing an introductory message. As shown in FIG. 5, the user is presented with a "download" button allowing the user to download an update installer. Once downloaded, the update installer allows the user to download and evaluate updates for the custom software environment.

Figure 6:
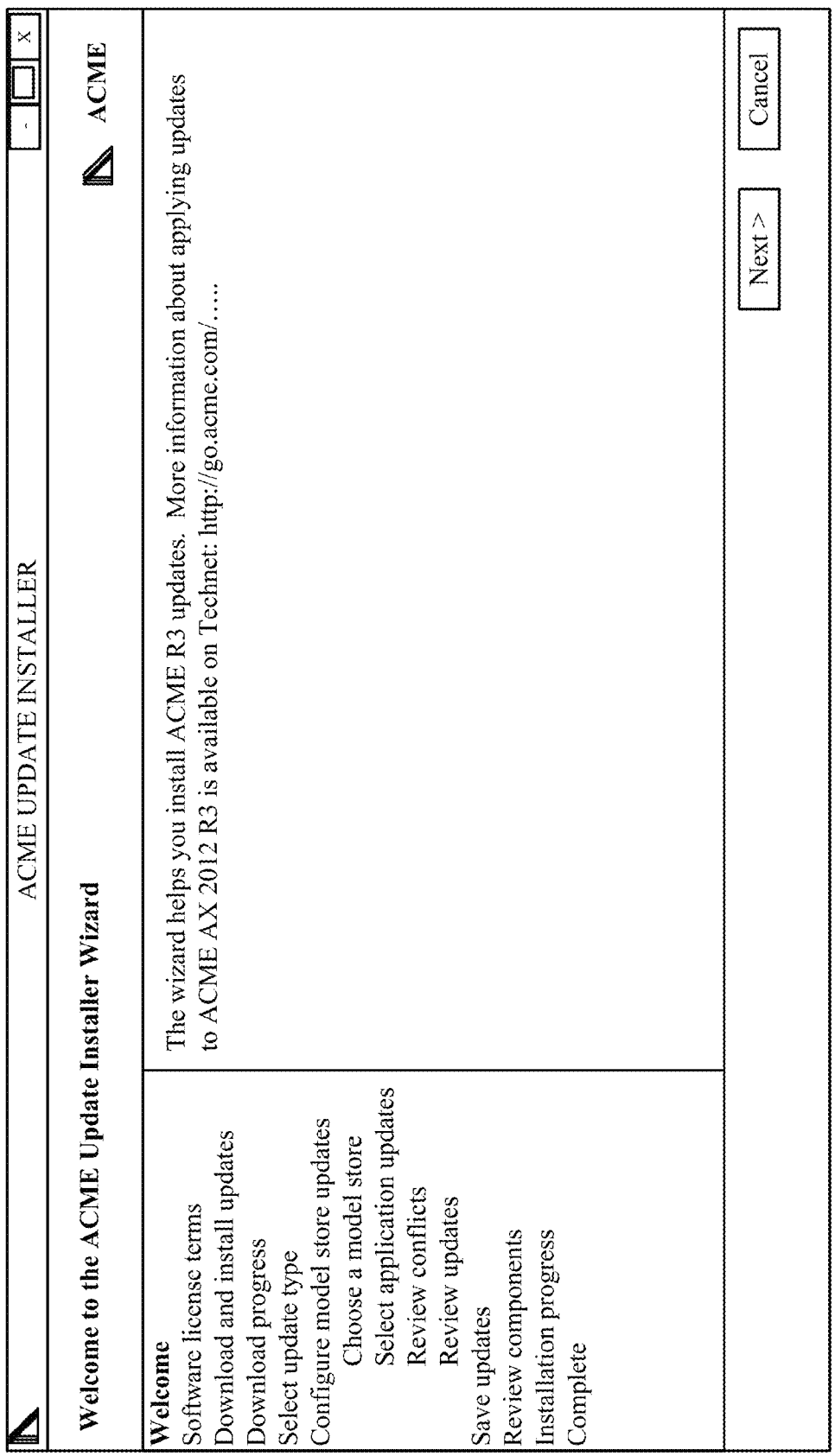

FIG. 6 shows a screenshot of a user interface provided by the update installer, once downloaded and started. The user is greeted with a welcome message indicating the function of the update installer. If the user actuates the "next" button the user interface shown in FIG. 7 will be provided. In FIG. 7, "software license terms" are shown. The user can accept the license terms by actuating the "Accept and continue" button.

Figure 8:
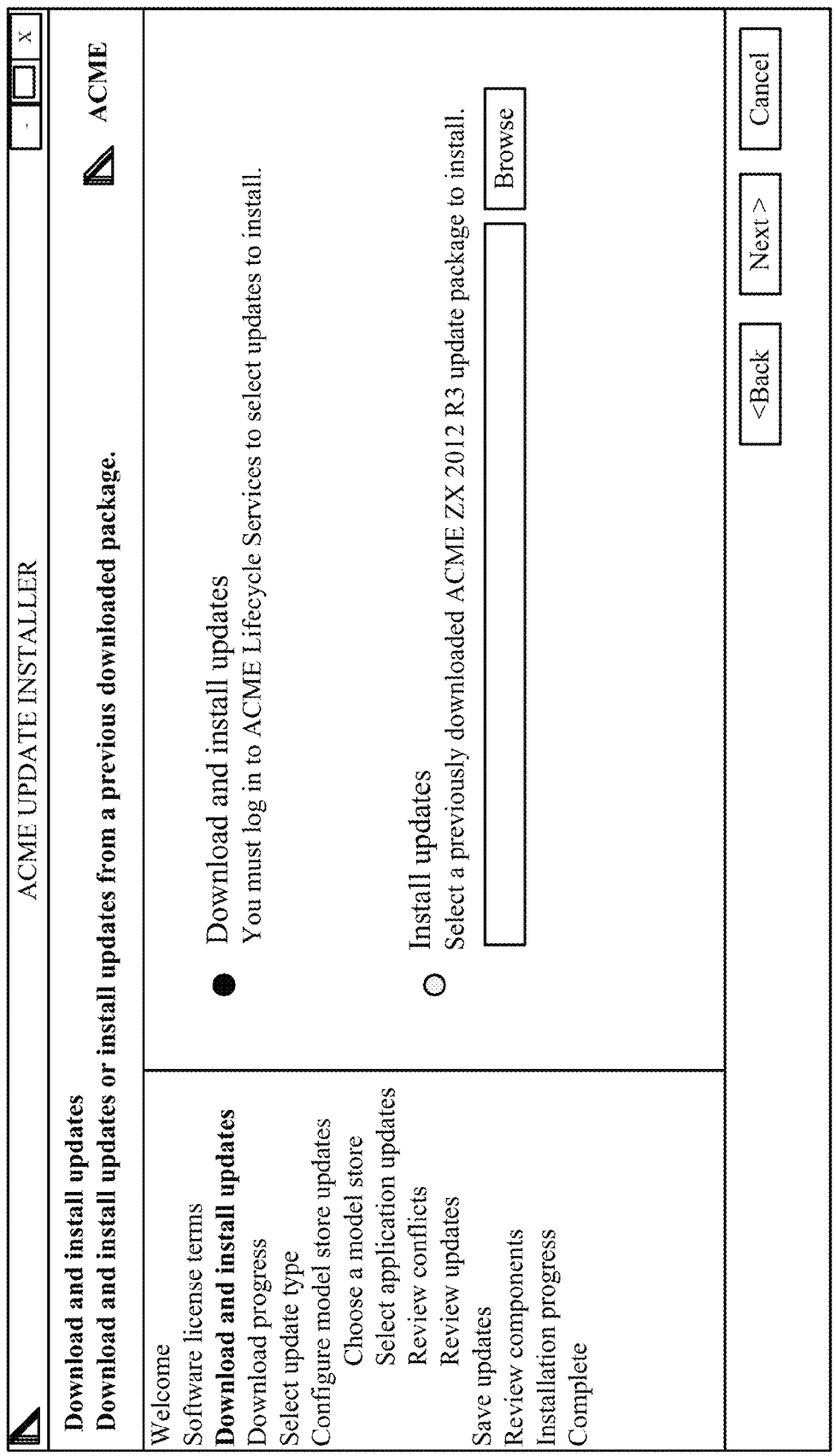

If the user accepts the license terms, another user interface, shown in FIG. 8, is presented to the user. The user is presented with a choice to either "download and install updates" by logging into life cycle services system 200 or install a previously downloaded update package. In the screenshot shown in FIG. 8, the user has selected the "download and install" option. Upon actuating the "Next" button, the user will be presented with the user interface shown in FIG. 9.

Figure 9:
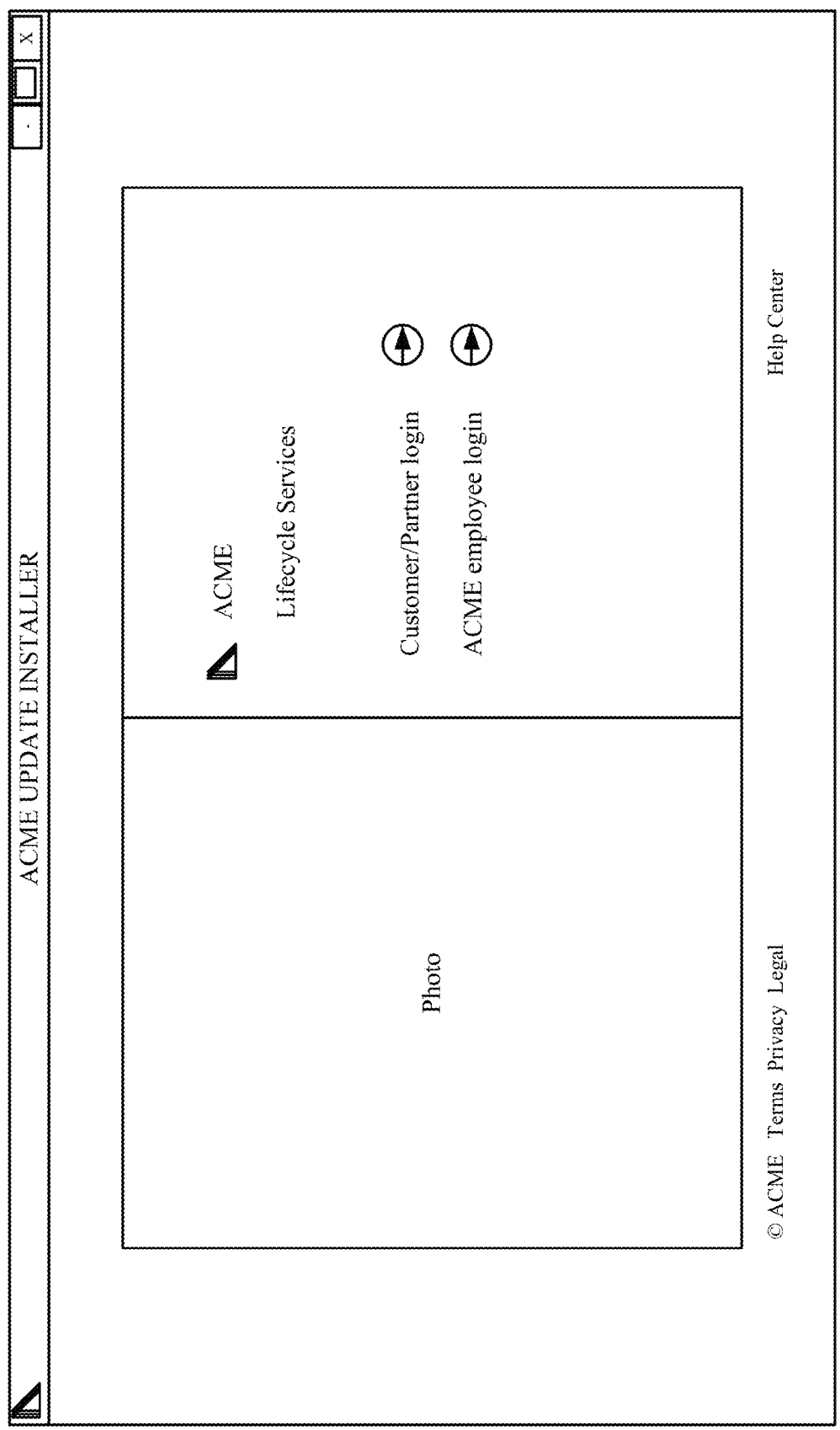
Figure 10:
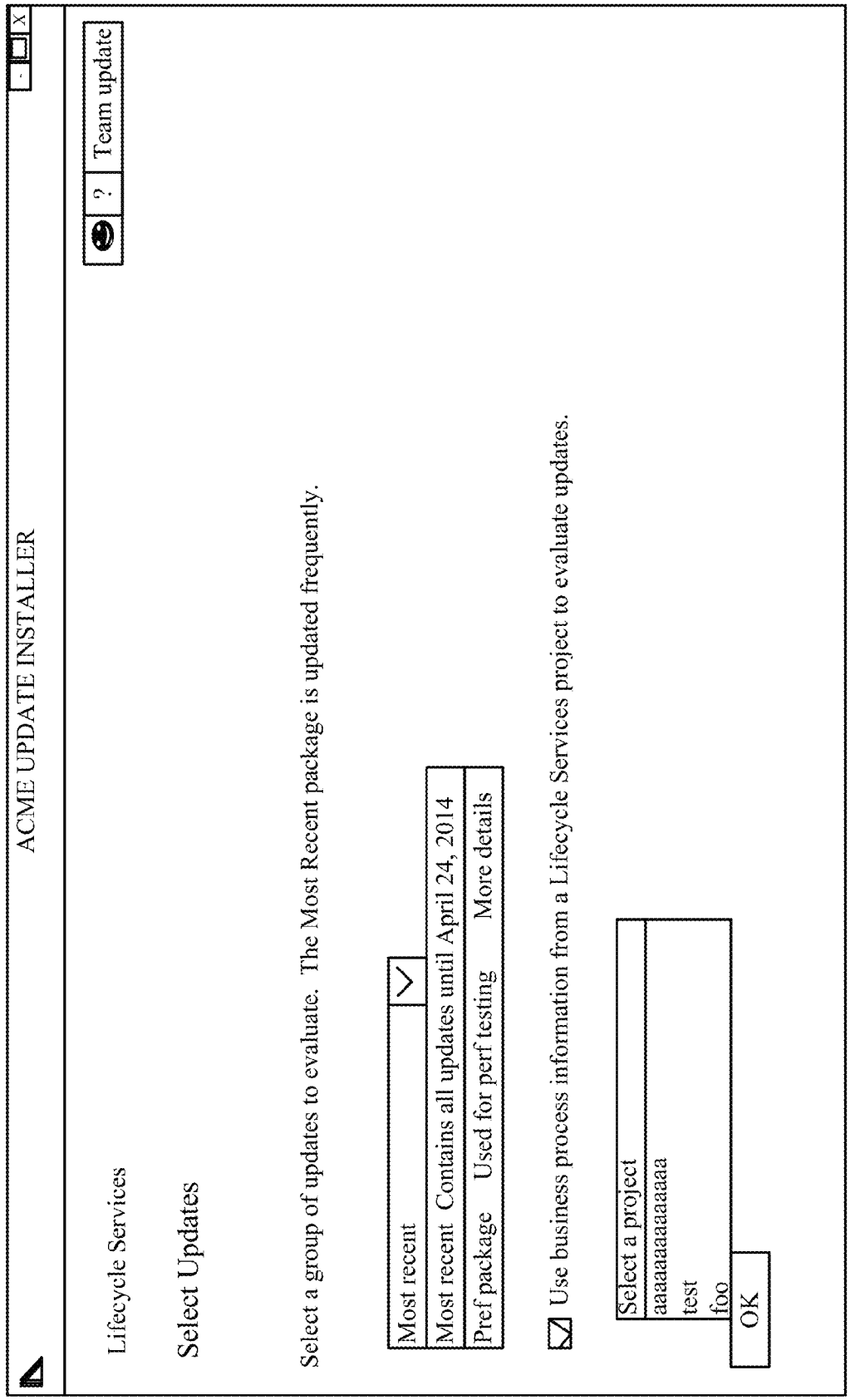

FIG. 9 shows a screenshot of an example of a user interface where a user may log into life cycle system 200 or another suitable update system provided in a cloud-computing environment. The user may select either a Customer/Partner login or a Microsoft Employee login. Once logged in, the user is presented with the user interface display of FIG. 10. In FIG. 10, the user may view a group of updates to evaluate. In the embodiment shown, the user may select a user interface element showing the "Most recent" updates. Additionally, a user interface element, such as a checkbox, is provided to allow the user to use business process information from a life cycle system 200 project to evaluate updates. In the example shown, the user has selected the checkbox and thus such business process information is used for the evaluation. Further, the user may select a project to update. The available projects shown in FIG. 10 include: "aaaaaaaaaaaaa," "test," and "foo." Once the user has selected a project, the user may actuate the "OK" button to proceed.

Figure 11:
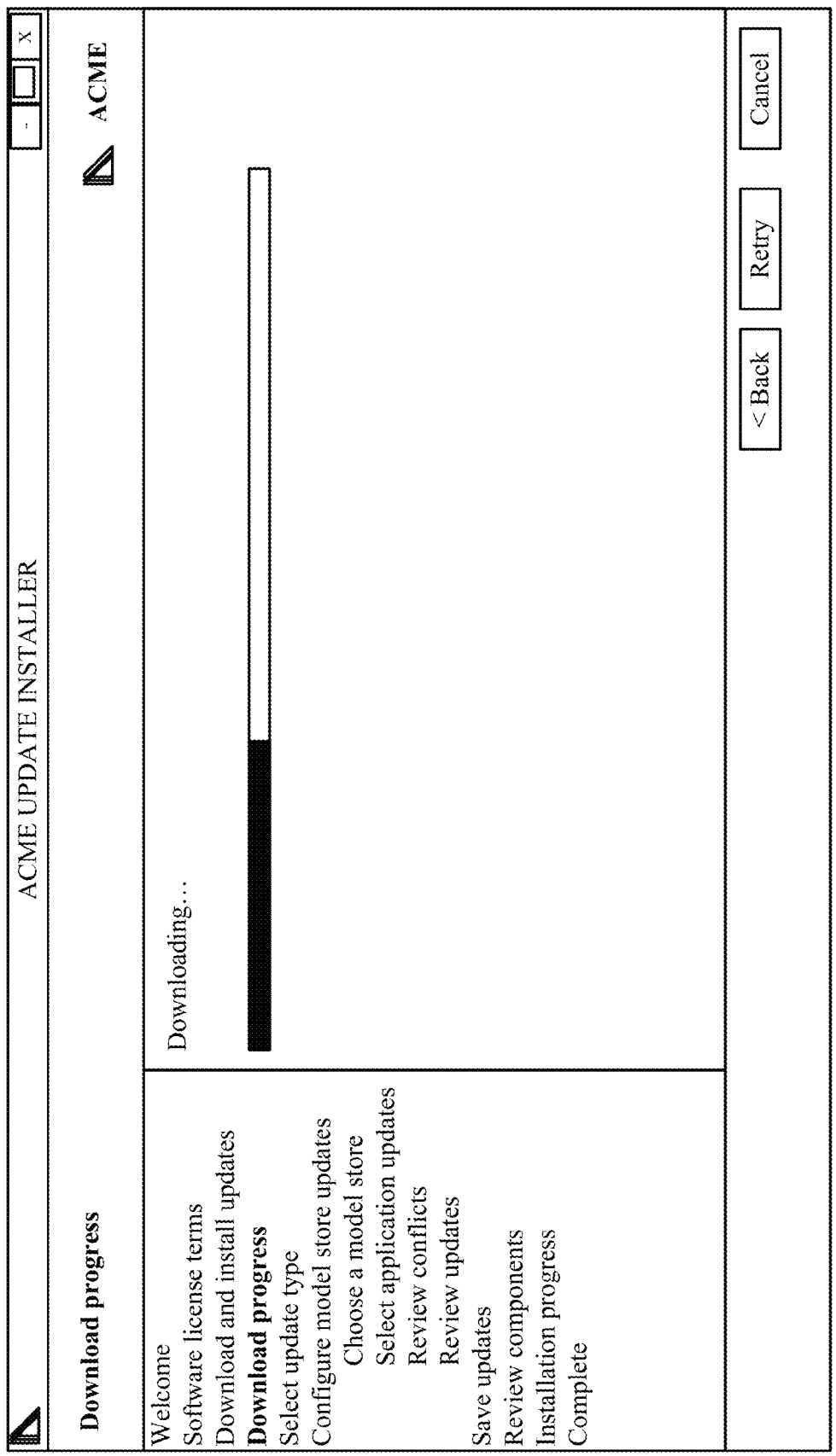
Figure 13:
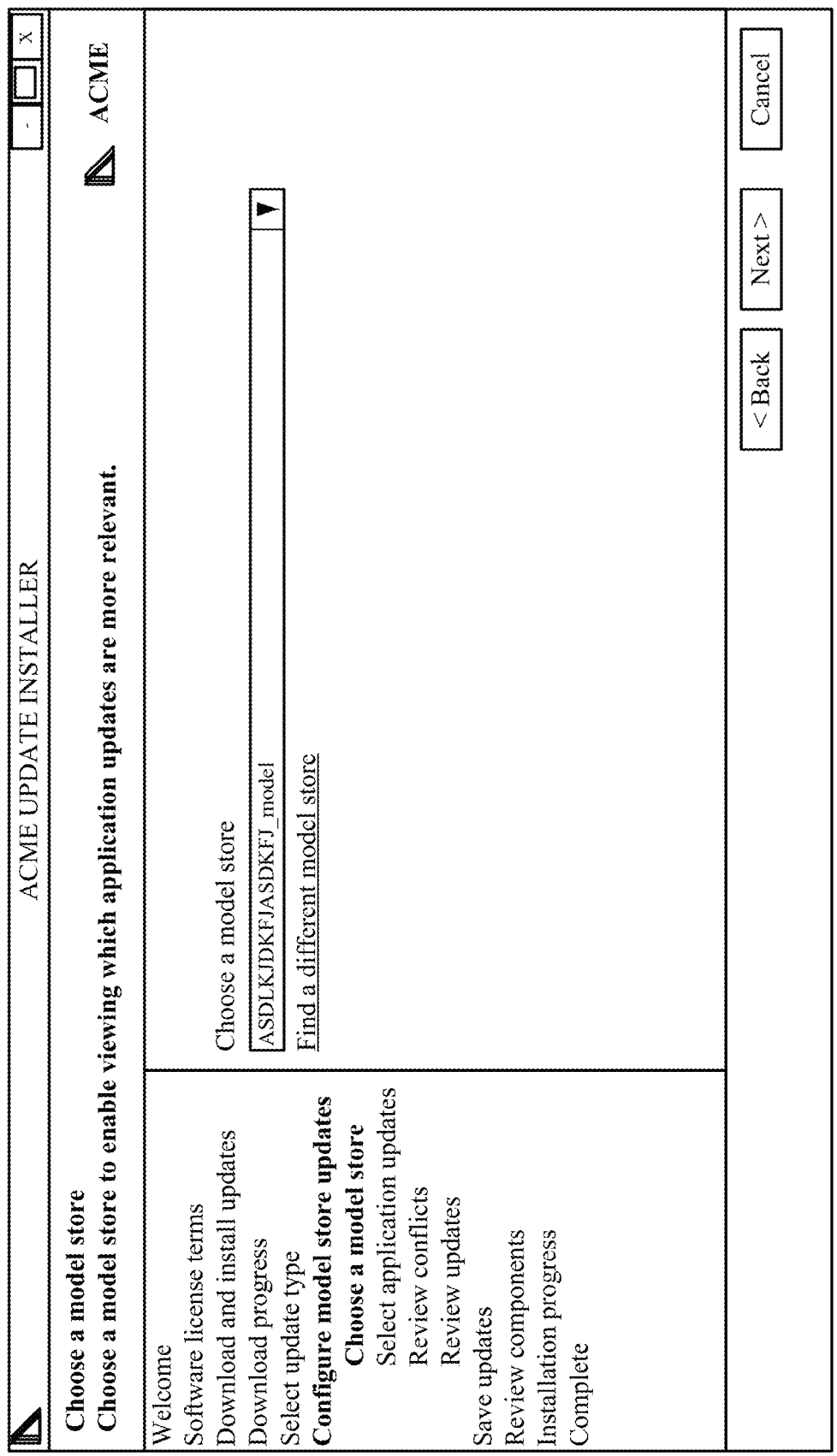

FIG. 11 shows a screenshot of an example of a user interface that is provided after the user selects a project. FIG. 11 indicates the download progress of the updates related to the selected project. Upon successful completion of the download, the next user interface display is provided to the user. FIG. 12 shows a screenshot of an example of a user interface provided to the user to allow the selection of "Binary updates," and/or "Application updates." In the example shown, the user has selected both. Upon actuating the "Next" Button, the next user interface display will be provided to the user. FIG. 13 shows a screenshot of an example of a user interface allowing the user the select a model store. In the example provided, the user has selected model store: "RDVM0026F9PRIYA-AXDB_model." The user may then continue the update process by actuating the "Next" button.

FIG. 14 shows a screenshot of an example of a user interface that is provided to the user once the user has selected the model store and actuated the "Next" button. The user is provided with the ability to "Select application updates." In this regard, the user may simply select a radio button, or other suitable user interface element, indicating that all updates are selected. However, the user may also select applicable updates. When the user so selects, additional filters such as "Fix type," "Module," "License Code," "Region/Country," and "Business process (Lifecycle Services)" can be used to filter applicable updates.

The "License code" filter mechanism allows the user to filter the applicable updates by license code elements. Such elements can include, for example, an electronic banking code element, the general ledger code element (or application), etc.

The "Region/Country" context filter mechanism allows the user to filter the applicable updates by region/country' context. For instance, systems that are deployed in one country may not be interested in some updates that were generated, in particular, for a system in another country. Thus, the applicable updates can be filtered by region/country context.

The "Business process" filter mechanism allows the user to filter the applicable updates based on the business processes to which they apply. By way of example, in one embodiment, life cycle system 200 includes a service 202-204 that uses a business process modeler to generate a model of the business processes in a given customer business system 101. Thus, the set of business processes 209 for the individual customer business system 101 is stored so that the user can view the various business processes in system 101. Update installer component 106 illustratively accesses the set of business processes 209 from life cycle system 200 and displays those processes in the user input mechanism. Thus, the user can select the particular business processes in business system 101 to filter applicable updates.

Figure 16:

Additionally, a search box can be provided, as shown in the example, allowing the user to search for a particular update. The updates indicated in the example shown in FIG. 14 are grouped according to fix type. Thus a major feature update (KB2929061:Test 12 for Dependency Tool) is shown separately from the 17 optional fixes. An additional display pane has tabs for "Details" and for "Conflicts." In FIG. 14, the "Details" tab is selected and no details are shown. In contrast, FIG. 15 shows the "Conflicts" tab selected and a "Conflict summary" provided indicating that there is one "Classes" conflict for the 17 optional fixes. The user may select the "Get conflict details" link and obtain additional information about the conflict. FIG. 16 shows a screenshot of an example of a user interface provided to a user in order to provide more information about a conflict. In the example shown, the conflict is related to a class in the USR layer. More particularly, the conflict is related to an Object named SysChecklist_Servicing. The display also shows that there is only one such conflict. Further, the user interface display may also include user interface element that allows the user to "Export to Excel" the conflict information or start an "Impact Analysis wizard." In order to proceed, the user actuates the "Next" button.

Figure 17:
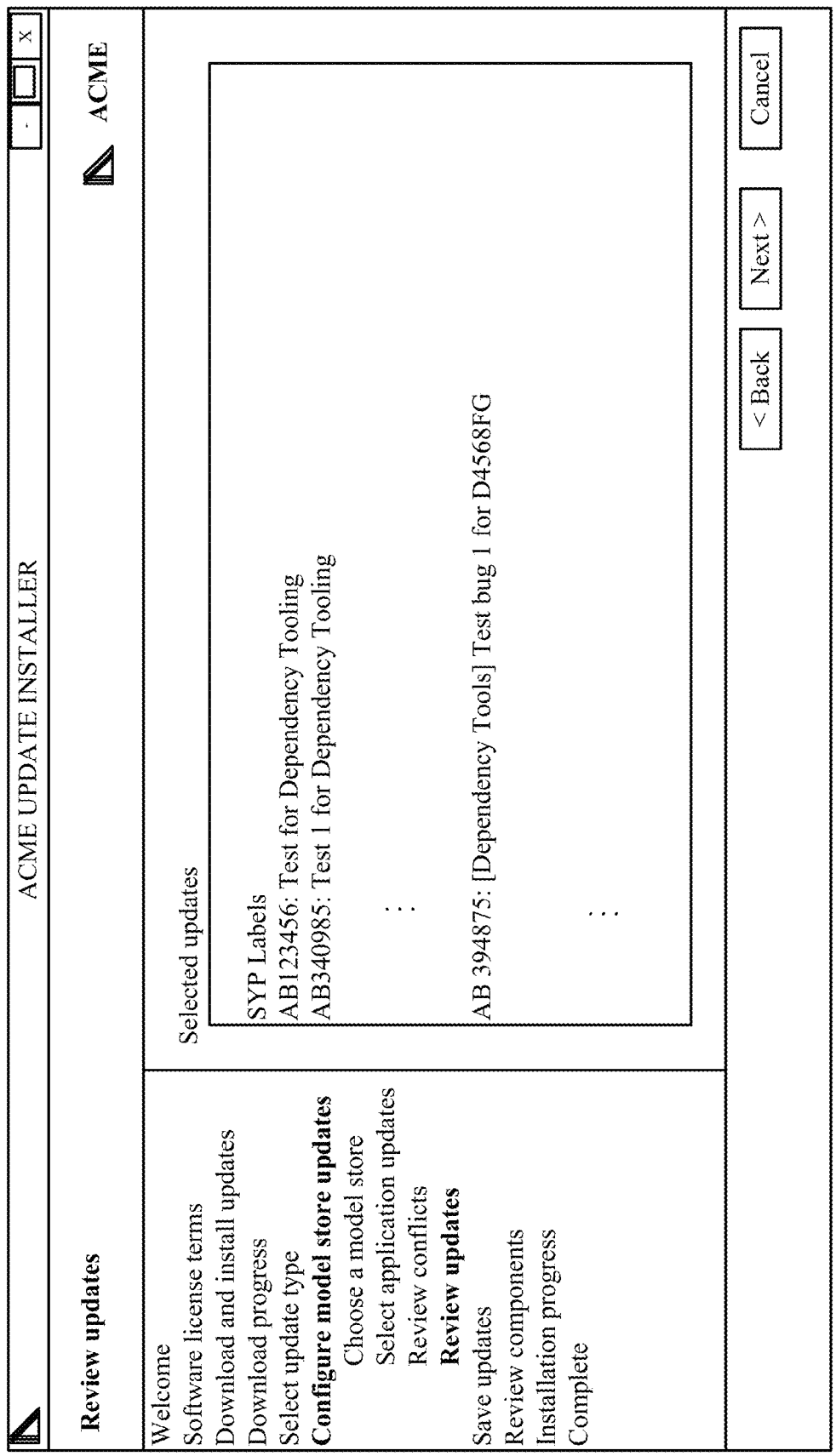

FIG. 17 shows a screenshot of an example of a user interface that is provided to the user in order to review the selected updates. If the user agrees with the listing of selected updates, the user may select the "Next" button to proceed. If, however, the user wishes to change the selection, the user may select the "Back" button to return to an earlier screen in order to change the selection.

Figure 18:
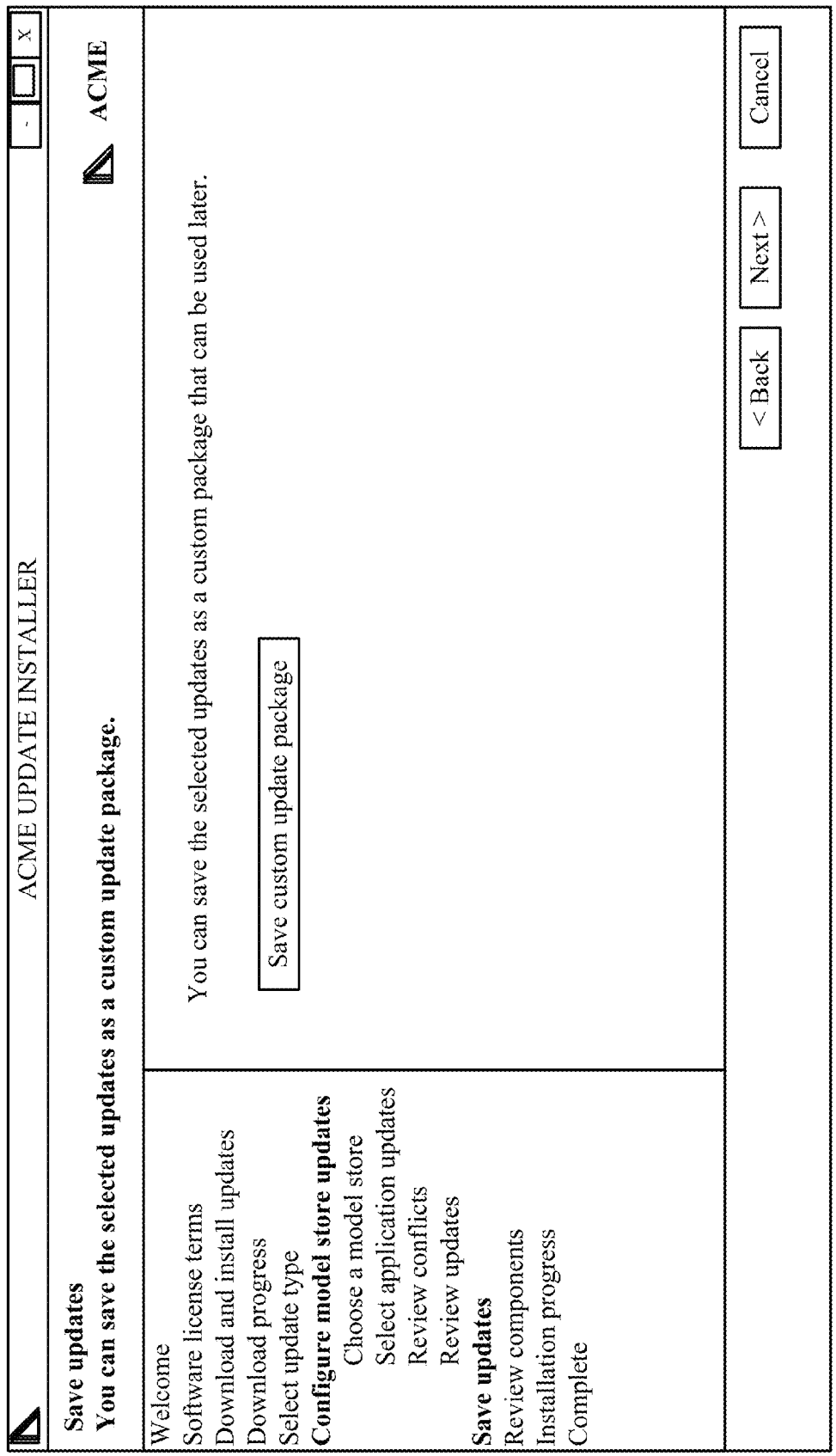
Figure 19:
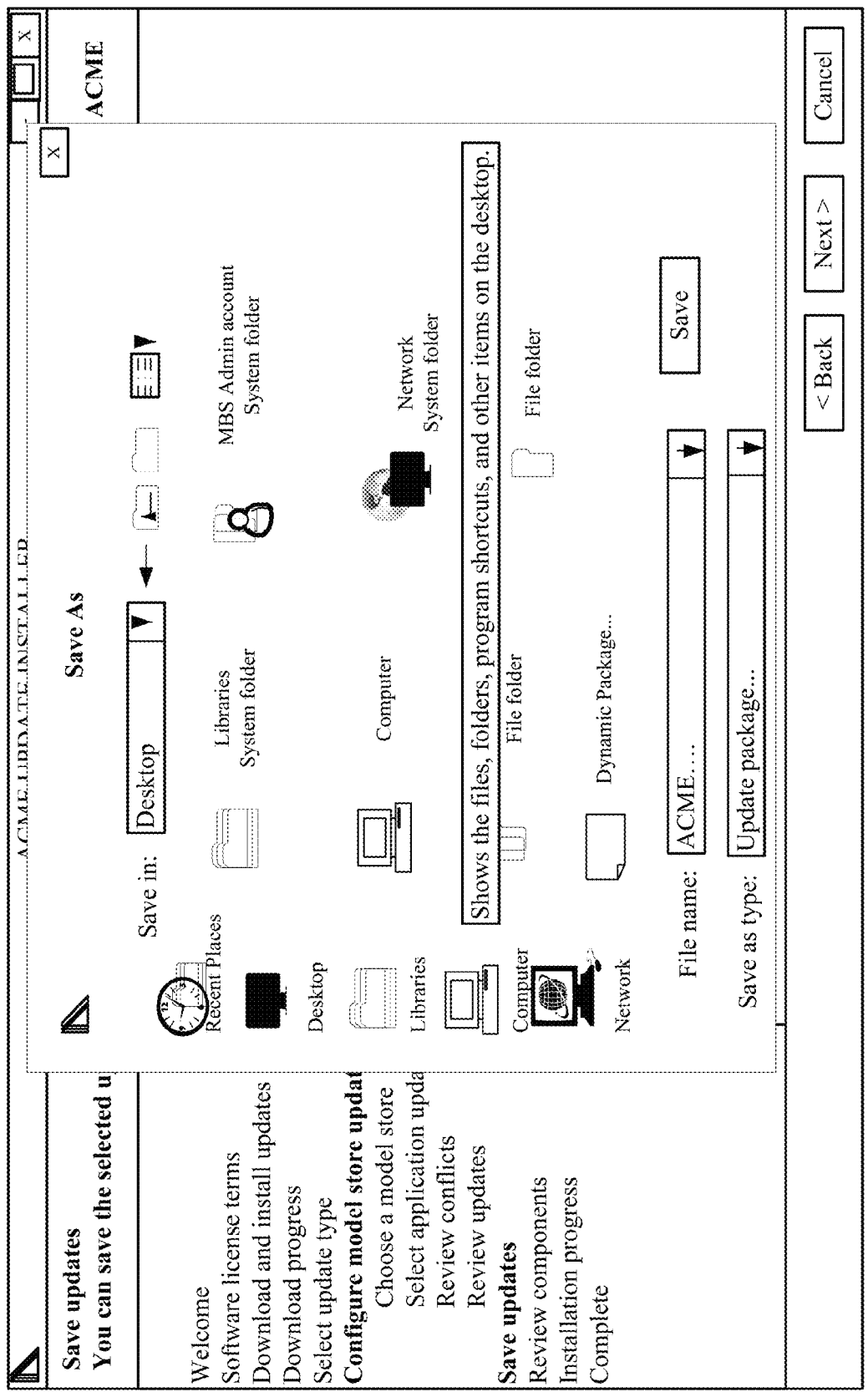

Once the user has accepted the listing of updates by pressing the "Next" button a user interface display is provided allowing the user to save the updates. FIG. 18 shows an example of a user interface display allowing the user to save updates. The user is provided with a button that, when actuated, will "Save custom update package." Upon pressing the button, a SaveAs box is provided allowing the user to name the file and select its type and location. Once the user has entered the requisite information, the user may press the "Save" button to save the custom update package.

Figure 20:
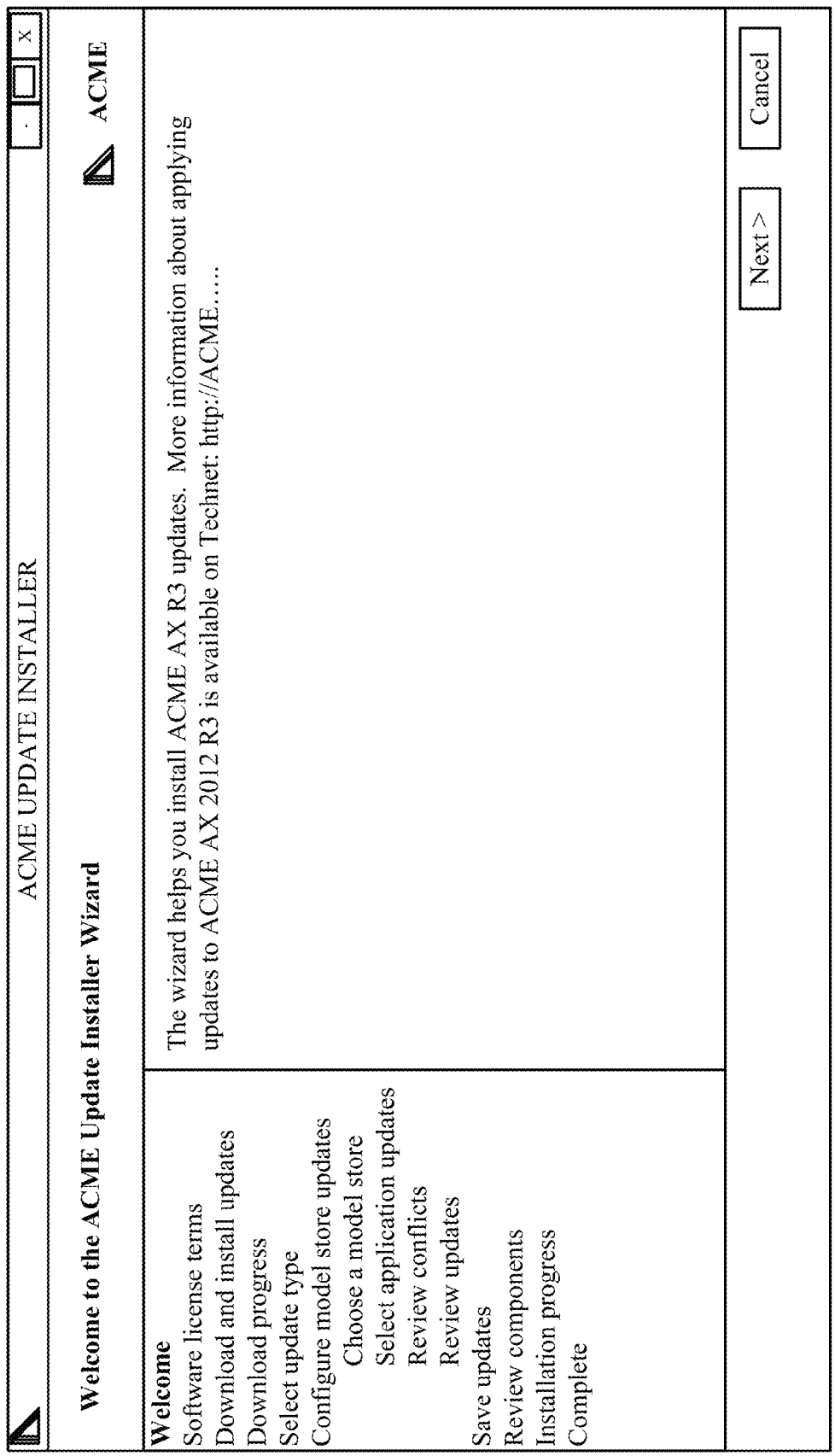
Figure 22:
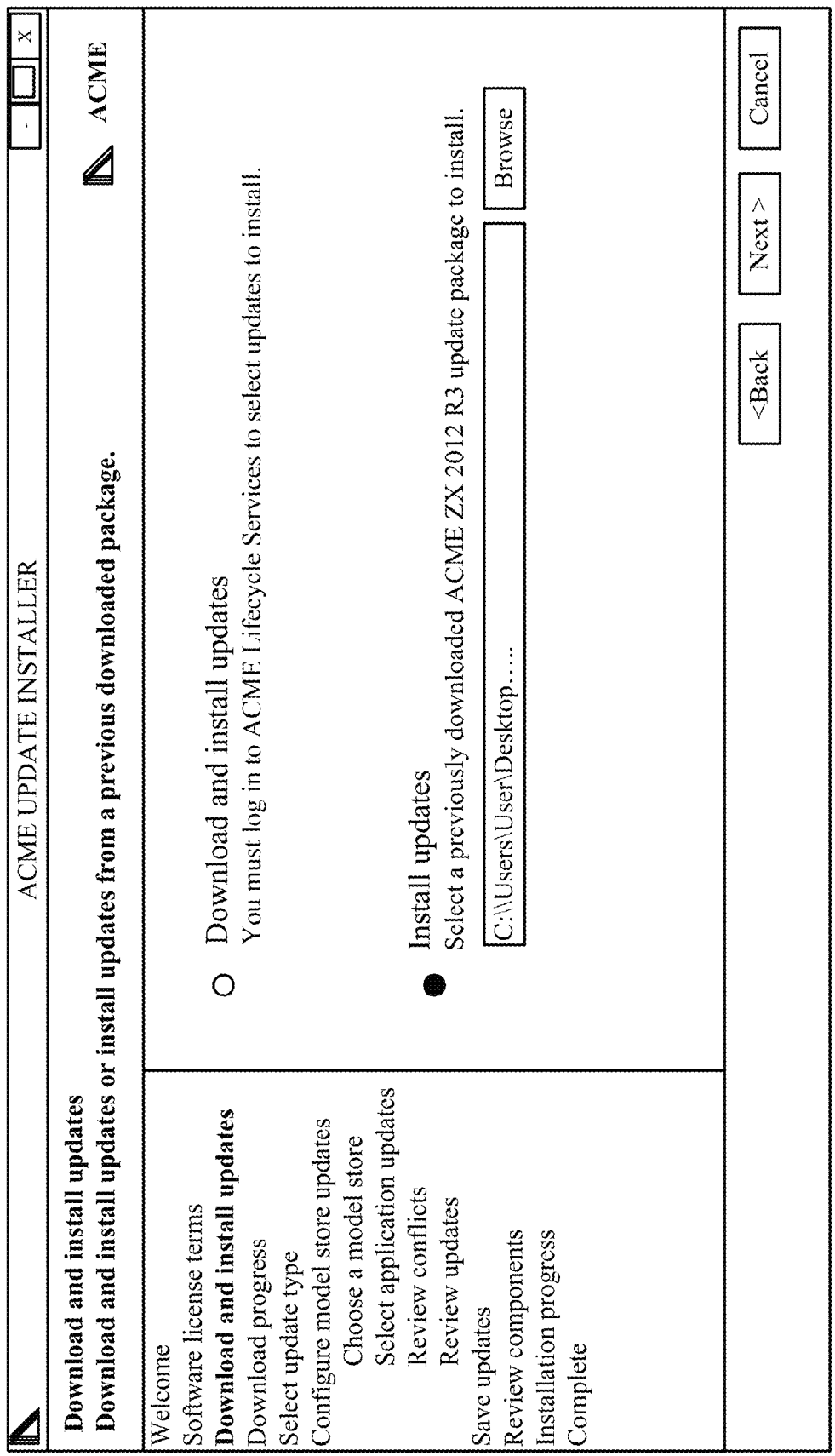
Figure 23:
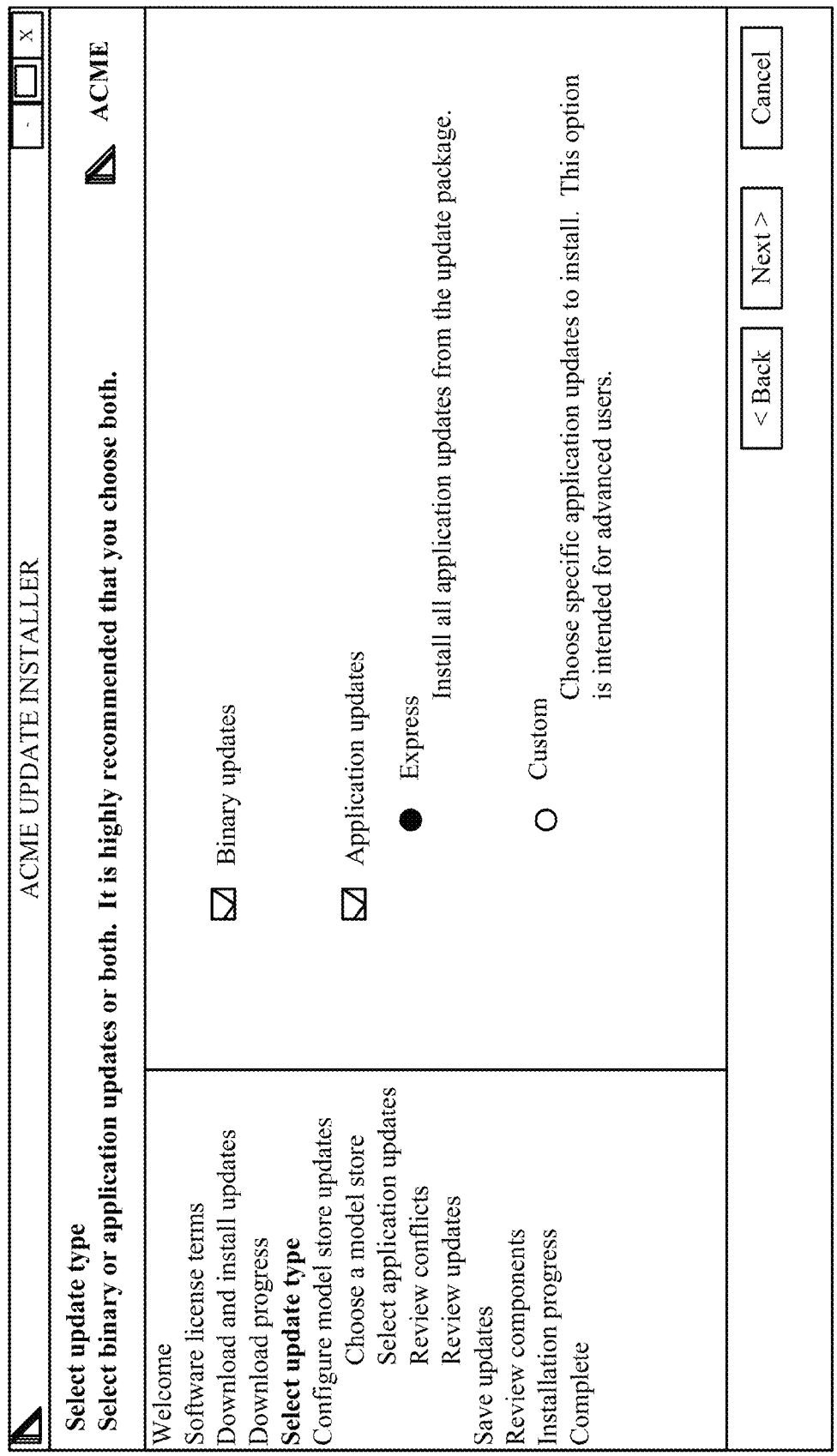

Once the custom update package has been saved, the update may be applied in an off-line mode. That is, the user need not log in to a cloud-based update provider. The process of applying the saved custom update package begins similarly to the online version. For example, the user interfaces shown in FIGS. 20 and 21 are identical to those of FIGS. 6 and 7 and need not be described again. Additionally, while the user interface shown in FIG. 22 is similar to that of FIG. 8, the user has chosen to install a previously downloaded update package ("C:\Users\MBSUser\Desktop\DynamicsAXPackage.axupdate"). Upon actuating the "Next" Button, the user is presented with the next user interface display. FIG. 23 is a screenshot of an example of a user interface presented to a user to allow the selection of "Binary updates," "Application updates" or both. Additionally, the user interface shown in FIG. 23 allows the user to select between an "Express" update mode in which all application updates are installed from the update package, or to select a "Custom" mode where the user may choose specific application updates to install. Once the user has made his/her choices, the user continues by pressing the "Next" button.

Figure 24:
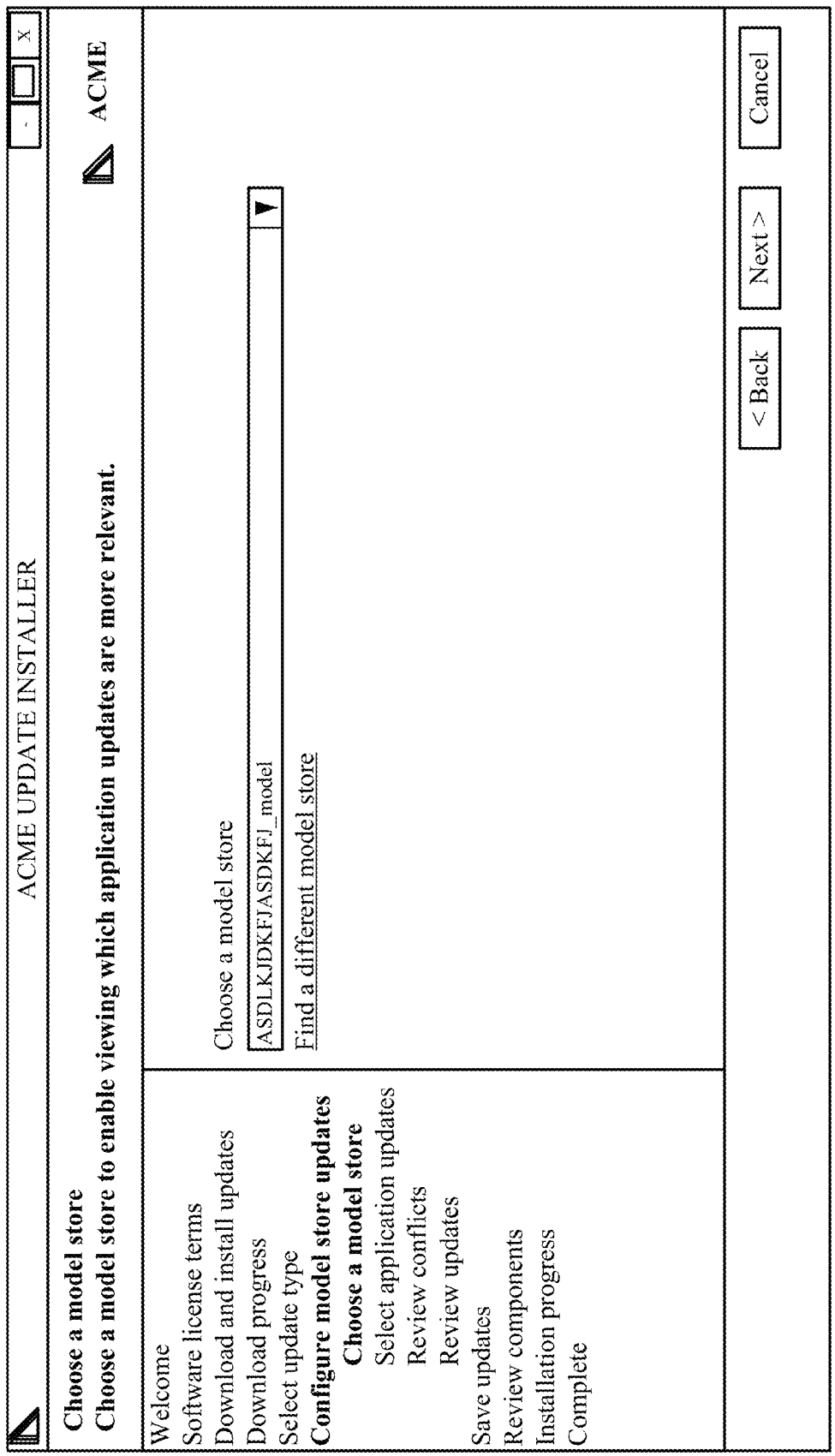
Figure 25:
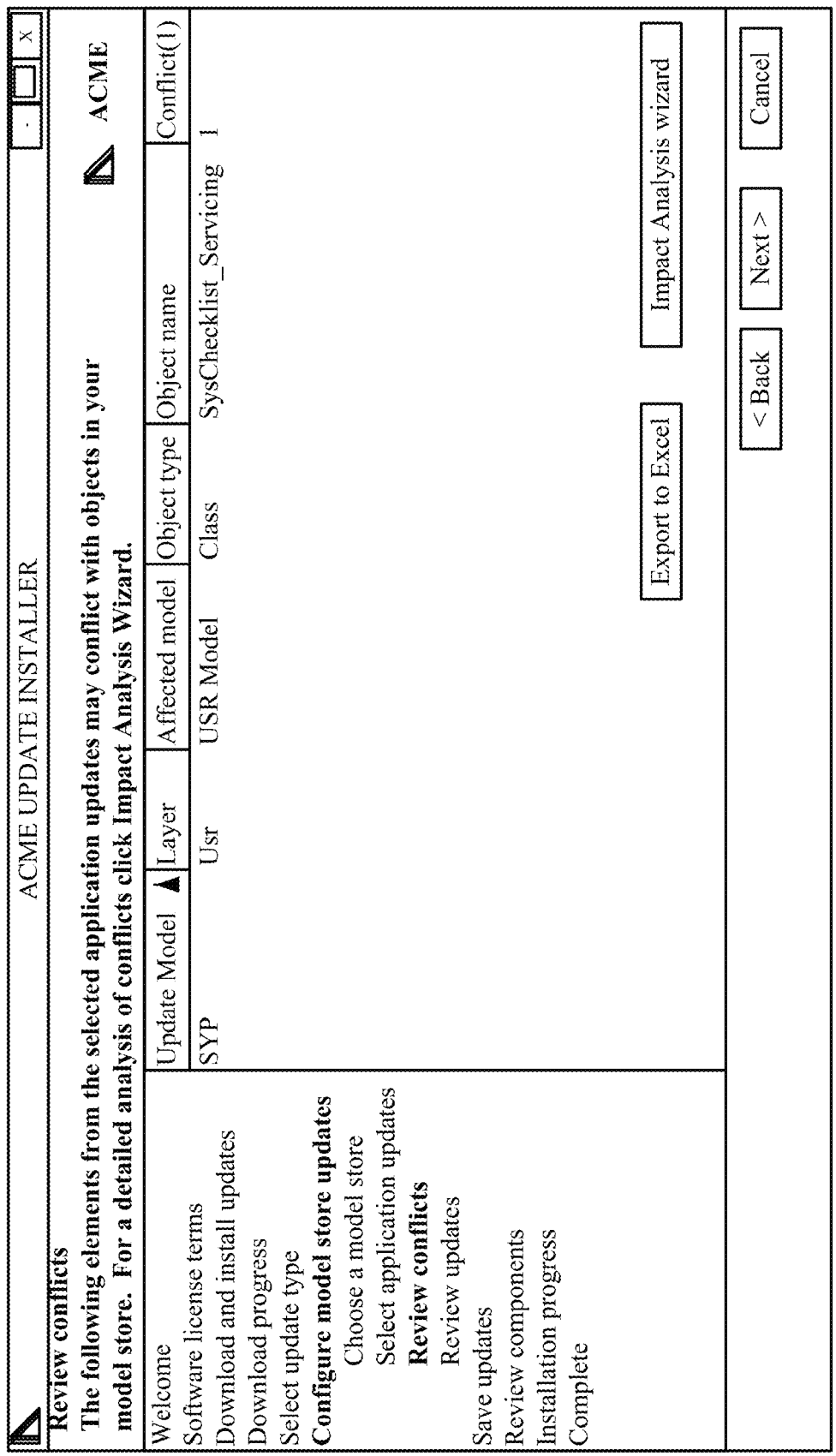
Figure 26:
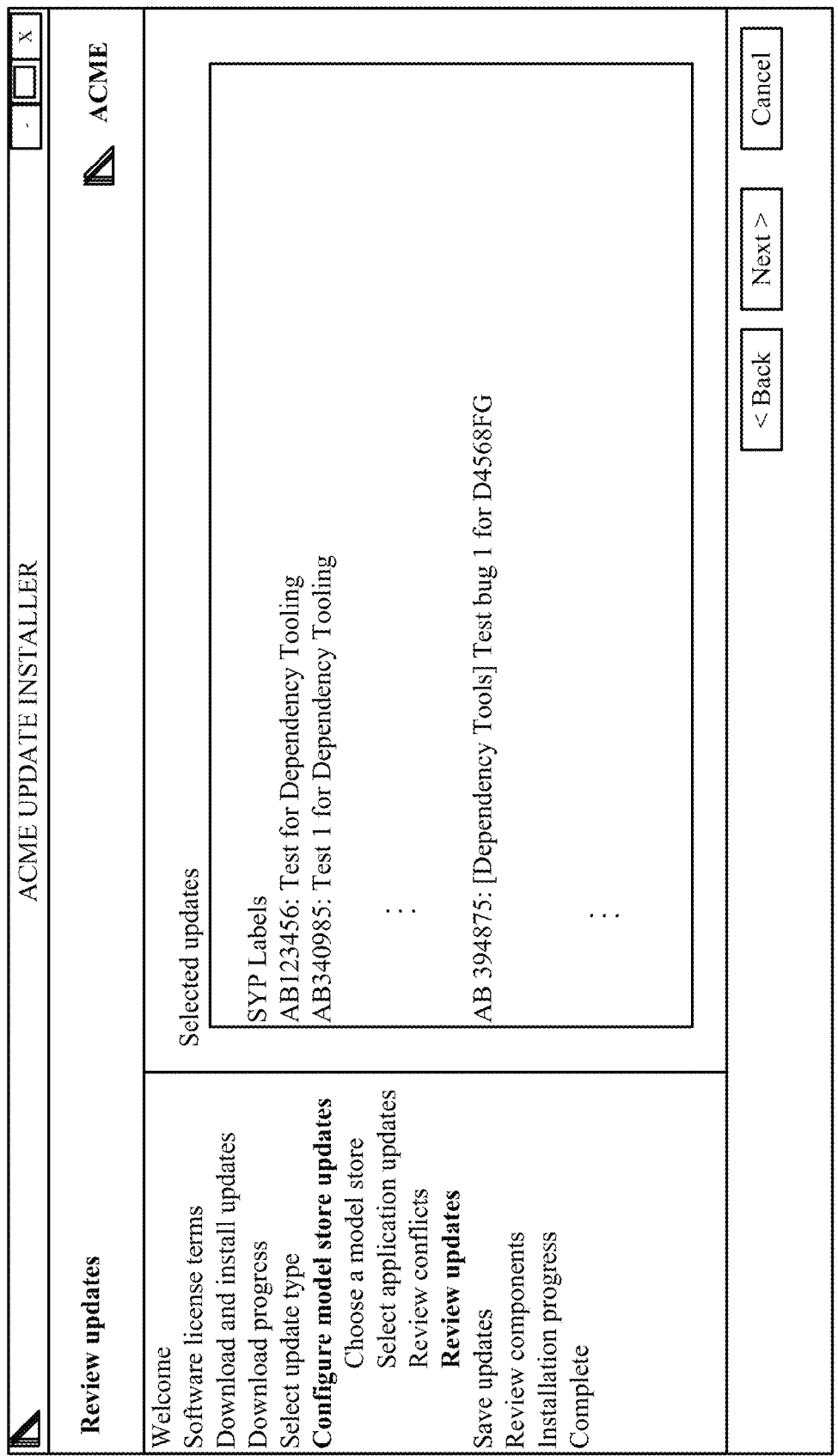

The user interfaces shown in FIGS. 24, 25 and 26 are identical to those of FIGS. 13, 16 and 17, respectively, and thus the descriptions thereof are not repeated.

Figure 27:
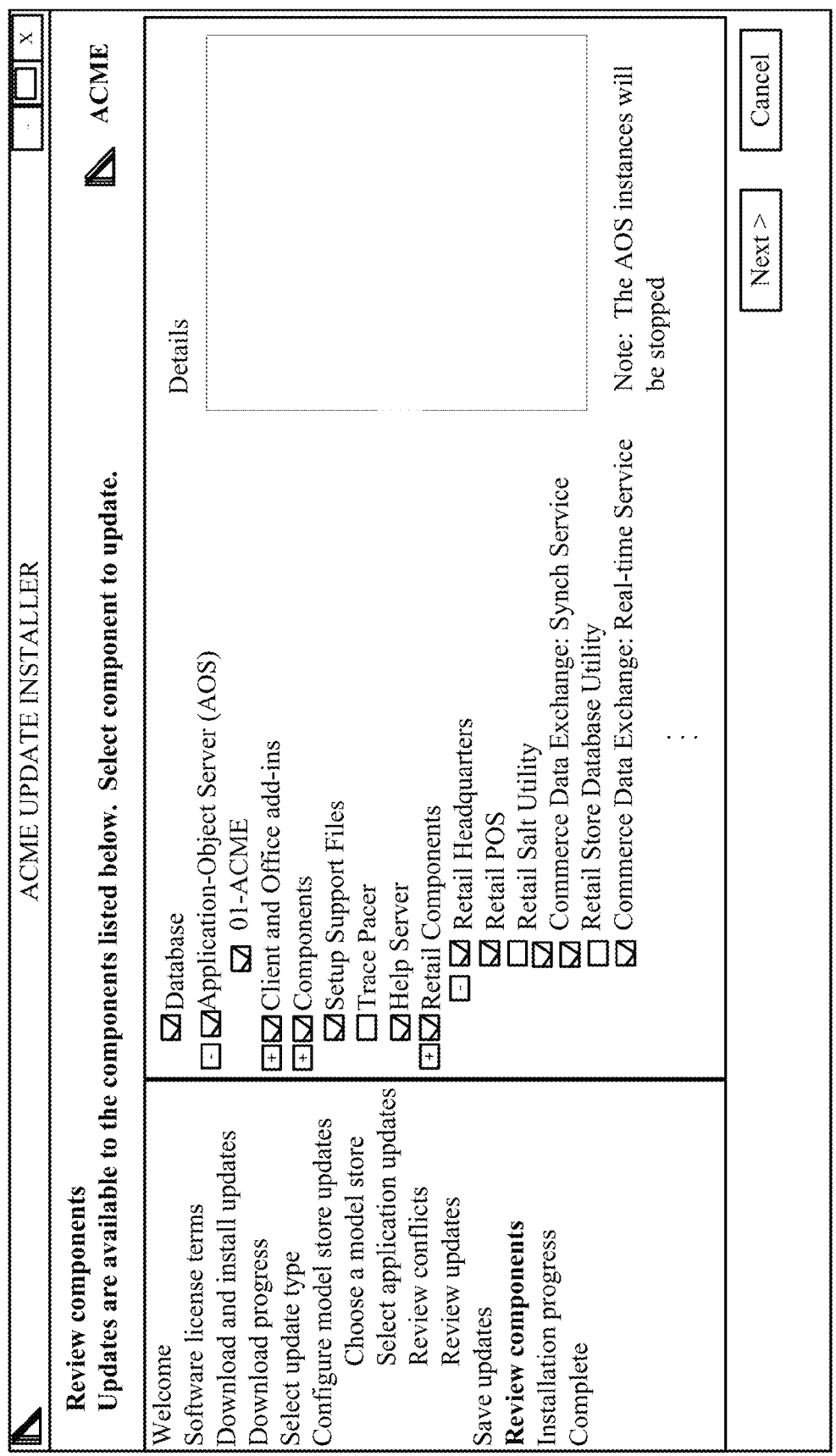

FIG. 27 shows a screenshot of an example of a user interface allow ing a user to review the components and select components of the custom software system to update. In the example shown, the user has chosen to update: Database, Application Object Server, Client and Office add-ins, Components, Setup Support Files, Help Server, and Retail Components. Moreover, within the Application Object Server component, the user has chosen the "01-Microsoft" component for updating. Similarly, in the "Retail Components" component, the user has chosen a number of subcomponents for updating and has left a number of subcomponents unchanged. Specifically, the user has chosen to update: Retail Headquarters, Retail POS, Retail Store Database Utility, Commerce Data Exchange: Real-Time Service, RetailCommerceAsyncClient, and RetailCommerceAsyncServer. The user has chosen to leave the following subcomponents unchanged: Retail Salt Utility, Commerce Data Exchange:Synch Service, Retail Online Channel, Retail SDK, Retail Server, and Retail Modern POS. Additionally, as shown in FIG. 27, the user is provided with a notification that the "AOS instances will be stopped during the update process." The user is also presented with an option to restart such AOS instances after installation. Once the user is satisfied with his/her choices, the user actuates the "install" button thereby causing the installer to perform the installation of the updates.

At this point in the description, the user has now selected a potential set of updates to be applied (or installed) and has reviewed not only the impact that the selected updates will have on the set of business processes in business system 101, but the impact it will have on the object and layer levels as well. The user has reviewed the conflicts that will be generated and can review even detailed information corresponding to the impact and to the conflicts. The update selection is saved so that it can be exported for application in other environments as well.

Figure 28:
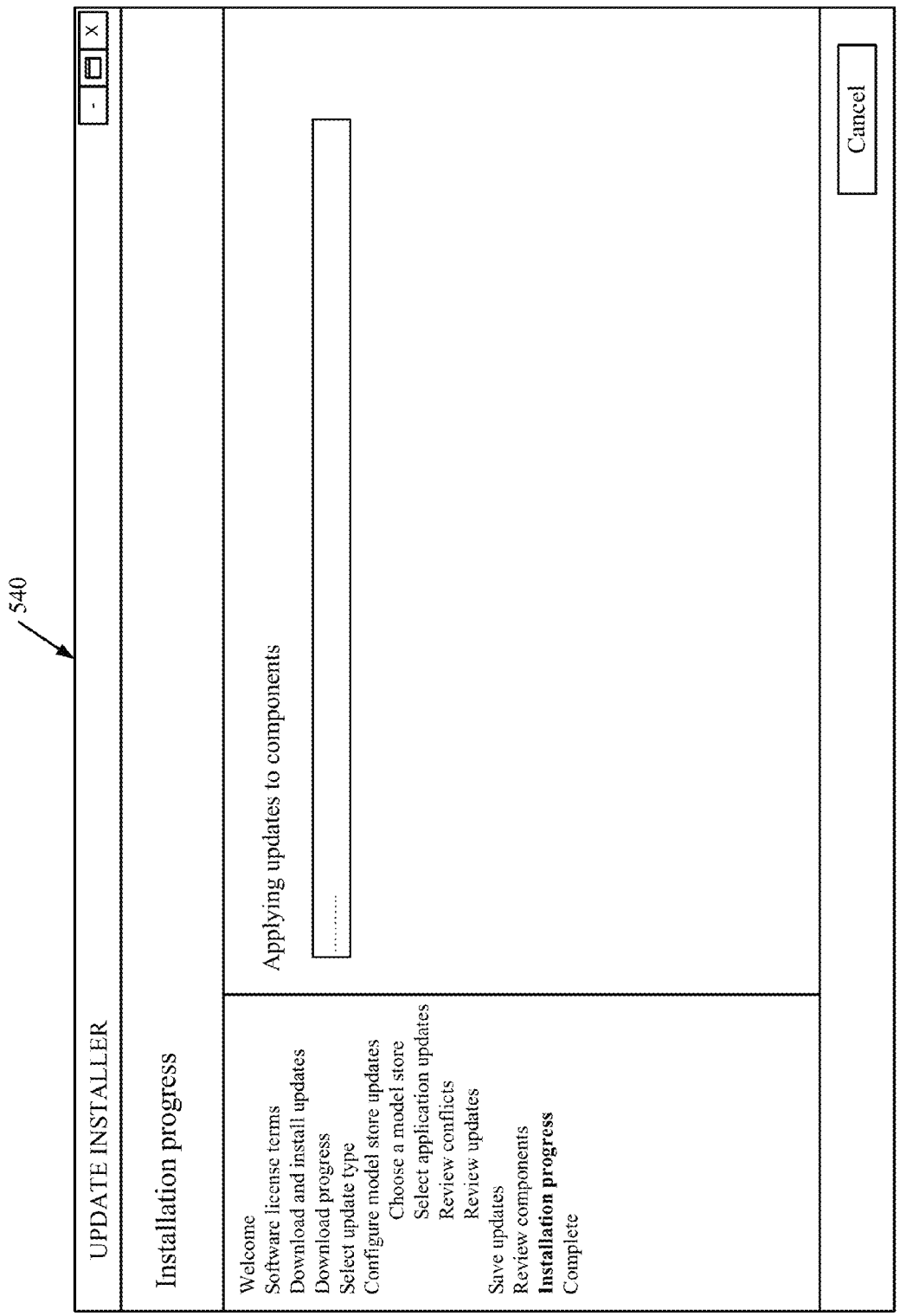

Once the user actuates the "Install" button, the installer will install the selected updates. During installation, installation engine 136 can generate a progress update display, such as user interface 540 shown in FIG. 28. Of course, other progress update displays can be shown as well.

When installation engine 136 completes installing the updates, it also illustratively updates the update state tracking information 210 in life cycle system 200. Installation engine 136 then generates a user interface display that displays the status of the installation. The user interface can indicate for example, that the updates to some of the various components have been successfully installed, while the updates to others have not been successfully installed. If the user wishes to view more details, the user can illustratively actuate user input mechanism to be navigated to a more detailed log file that shows the details of the corresponding installation.

After the installation is complete, conflict resolution component 119 illustratively generates a user interface display that allows the user to request that conflict resolution component 119 will automatically resolve as many conflicts as it can, without user intervention. Resolving conflicts is also referred to herein as performing a code merge.

The conflict resolution component 119 can do this in a variety of different ways. For instance, it may be that the base system of business system 101 offered by the manufacturer of system 101 is being updated with cumulative update package 120. Thus, there may be an original base version of system 101 that is updated to obtain an updated version of system 101. However, it may also be that the organization deploying system 101 has modified or otherwise customized the base version of system 101. Thus, in one embodiment, conflict resolution component 119 does a three-way compare that compares the original base version of system 101, with the updated version of system 101, and with the customized version of system 101 that is actually deployed at the organization. Conflict resolution component 119 then performs operations so that the customized version of system 101 that is actually deployed will be updated in a way to eliminate conflicts.

An example may be helpful. For instance, assume that the base version of system 101 has an element named "string S clock". Assume that the user has customized the base version of system 101 so that the element in the deployed version of system 101 is now called "string S+1 clock", If the particular update being installed by the user changes the value of "string S clock" in the base version of system 101, then there is a conflict because the user has already customized that element to "string S+1 clock". Thus, conflict resolution component 119 does a three-way text based comparison to revise the update so that it is consistent with the user's customization of "string S clock" to "sting S+1 clock". Of course, conflict resolution component 119 can resolve conflicts in a wide variety of other ways as well.

Conflict resolution component 119 then stores conflict resolution (or code merge) results information so that it can be reviewed, or used, later. For instance, component 119 can store the object path where the merge was performed. It can store the total number of conflicts, the number of resolved conflicts, and a time stamp. Of course, if can store other information as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interfaces have been discussed. Such user interfaces can take a wide variety of different forms and can include a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 29:
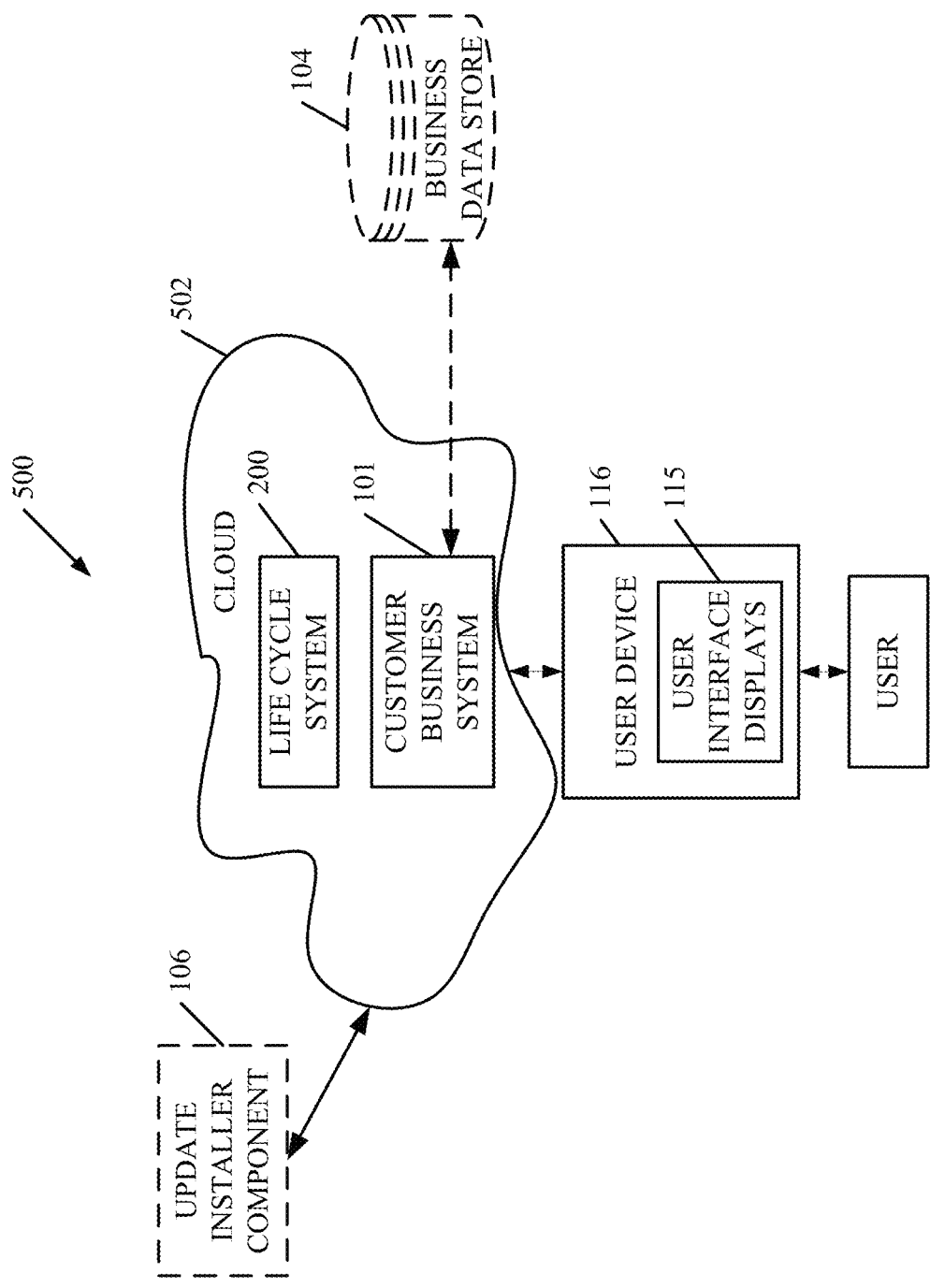
FIG. 29 show/s one embodiment of the architecture shown in FIG. 3 deployed in a cloud computing architecture.

FIG. 29 is a block diagram of architecture 100, shown in FIG. 3, except that its elements are deployed in a cloud computing architecture 500. The term "cloud". "cloud-based system", "cloud-based architecture", or similar terms refer to a network of devices (e.g. server computers, routers, etc.). Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially' seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 29, some items are similar to those shown in FIG. 3 and they are similarly numbered, FIG. 29 specifically shows that systems 101 and 200 can be located in cloud 502 (which can be public, private, or a combination where portions are public while others are private). Therefore, the user uses a user device 116 to access those systems through cloud 502.

FIG. 29 also depicts another embodiment of a cloud architecture. FIG. 29 shows that it is also contemplated that some elements of architecture 100 are disposed in cloud 502 while others are not. By way of example, data store 104 can be disposed outside of cloud 502, and accessed through cloud 502. Regardless of where they are located, they can be accessed directly by device 116, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be employed on a wide variety of different devices. Some of those devices include servers, desktop computers, laptop computers, tablet computers, or other mobile devices, such as palm top computers, cell phones, smart phones, multimedia players, personal digital assistants, etc.

Figure 30:
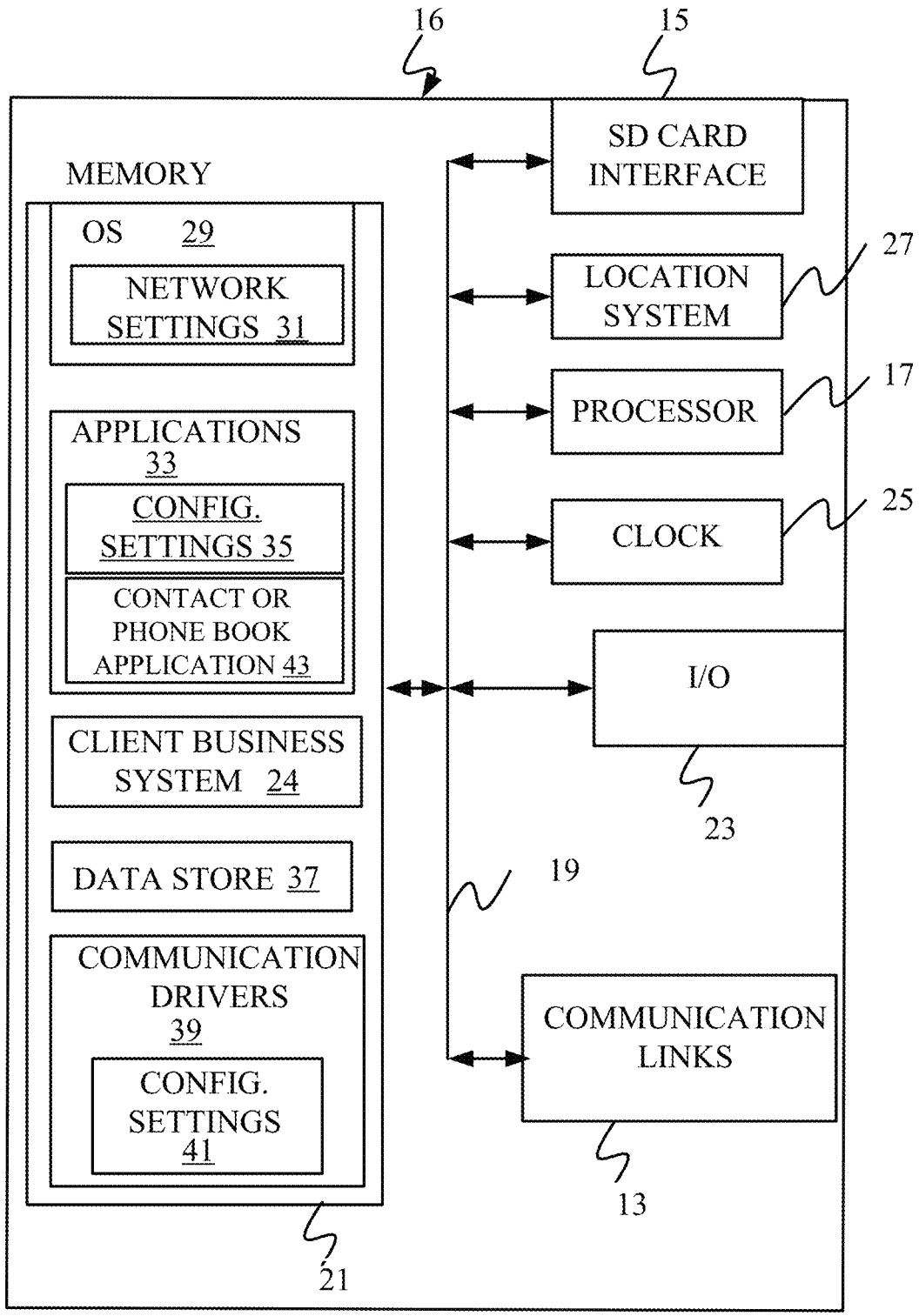
FIGS. 30-33 show various embodiments of mobile devices.

FIG. 30 is a simplified block diagram of one embodiment of a handheld or mobile computing device that can be used as a user's or client's hand held device 16, in which the present system (or parts of it) can be deployed. FIGS. 30-33 depict examples of handheld or mobile devices.

FIG. 30 provides a general block diagram of the components of a client device 16 that can run components of architecture 100 or that interacts with architecture 100. In device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

According to other embodiments, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user, Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 31:
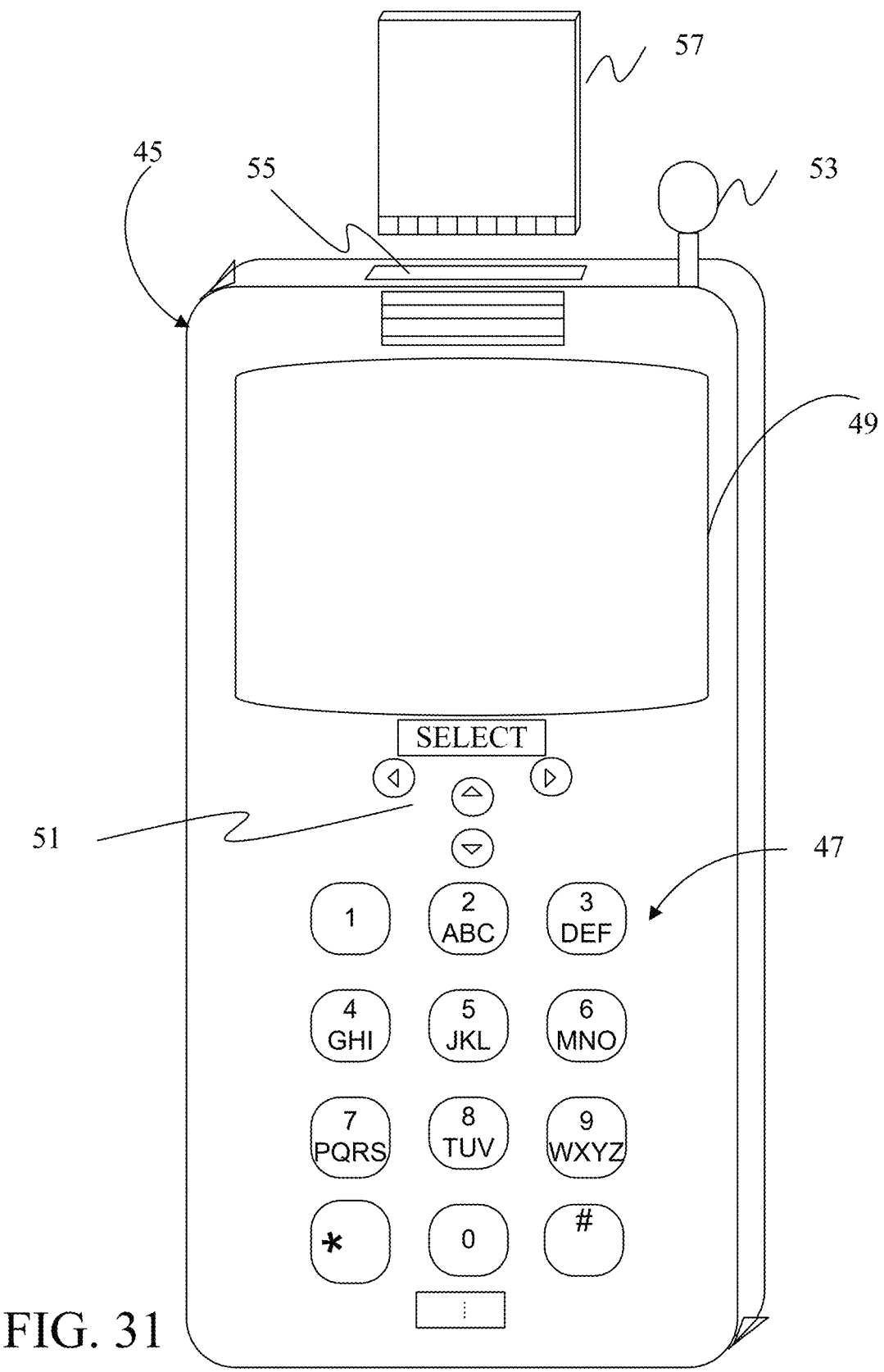
Figure 32:
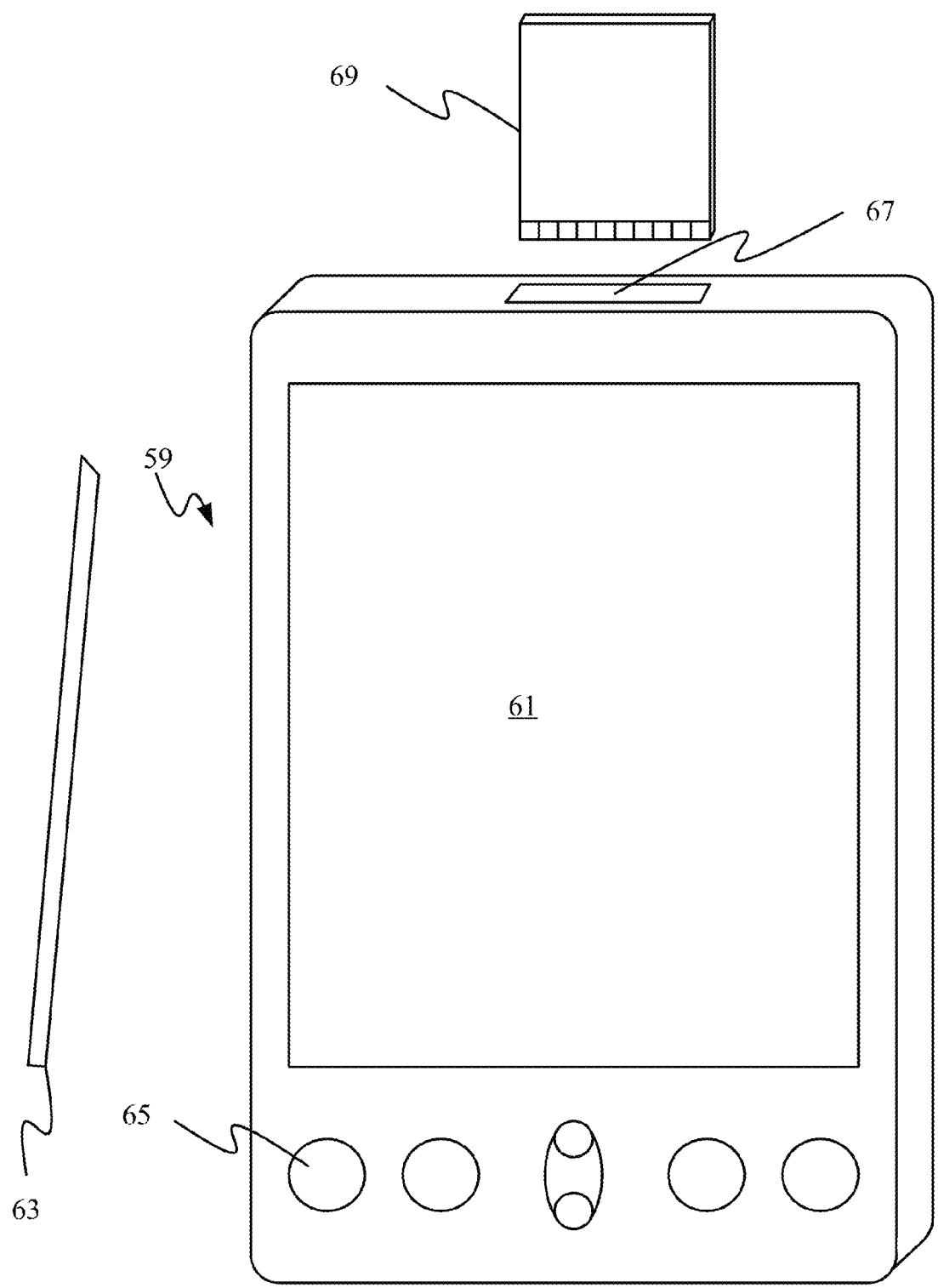

FIGS. 31 and 32 provide additional examples of devices 16 that can be used, although others can be used as well. In FIG. 31, a feature phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 32 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port.

As such, these connections are non-network connections. In one embodiment, mobile device 59 also includes a SD card slot 67 that accepts a SD card 69.

Figure 33:
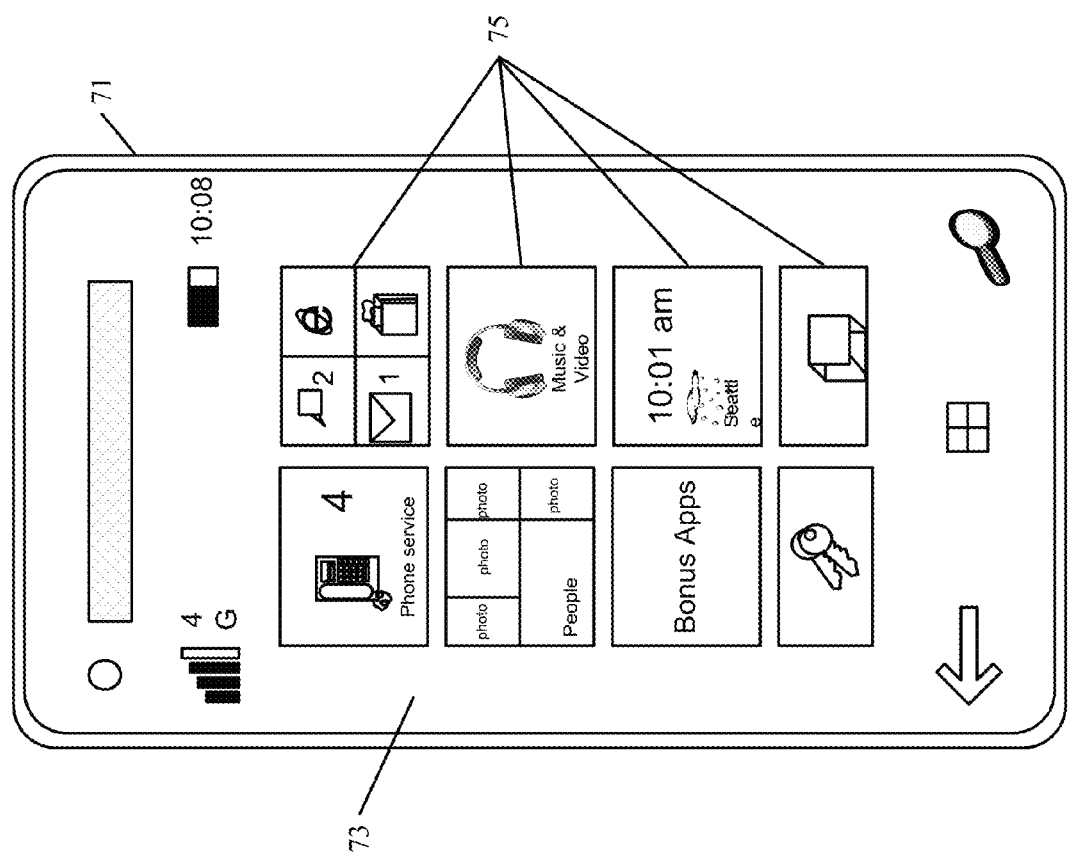

FIG. 33 is similar to FIG. 31 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone FIG. 31 through FIG. 33 illustrate particular forms of device 16 illustrated in FIG. 34. It should be appreciated that other forms of the devices 16, other than those shown in FIGS. 31-33, are possible.

Figure 34:
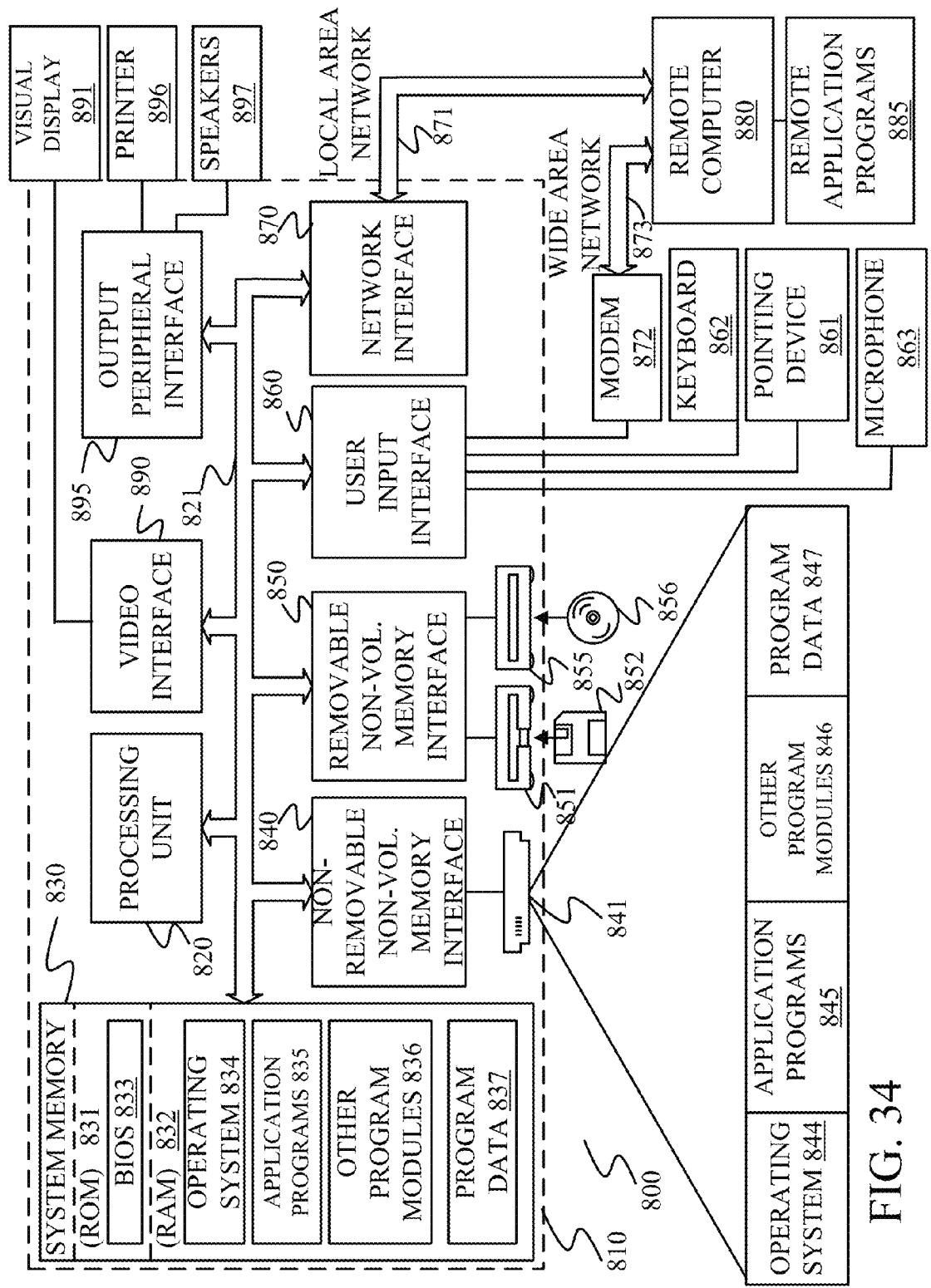
FIG. 34 is a block diagram of one illustrative computing environ ent.

FIG. 34 is one embodiment of a computing environment in which architecture 100, or parts of it, (for example) can be deployed. With reference to FIG. 34, an exemplary system for implementing some embodiments includes a general-purpose computing device in the form of a computer 810. Components of computer 810 may include, but are not limited to, a processing unit 820 (which can comprise processor 10 or the processor in system 200 or device 16), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 34.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 34 illustrates operating system 834, application programs 835, other program modules 836, and program data 837.

The computer 810 may also include other removable/non-removable volatile/nonvolatile computer storage media. By way of example only, FIG. 34 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs). Program-specific Standard Products (ASSPs), System-on-a-chip systems (SOCs), Complex Programmable Logic Devices (CPLDs), etc.

The drives and their associated computer storage media discussed above and illustrated in FIG. 34, provide storage of computer readable instructions, data structures, program modules and other data for the computer 810. In FIG. 34, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB), A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 41 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 34 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited Co the specific features or acts described above. Rather, the specific features and acts described above are disclosed as example forms of implementing the claims.

What is claimed is:

1. A method of updating a customized system, the method comprising:
   receiving an update request;
   obtaining contextual information that includes information about a customization that has been made to the customized system;
   generating a query for an update to the customized system based on the contextual information and version information of a module and an application deployed by the customized system;
   receiving a query response indicative of a potential update;
   obtaining the potential update based on the query response;
   receiving a selection relative to an update type;
   receiving a selection of a model store after obtaining the potential update;
   receiving a selection of an application update related to the selected model store after receiving the selection of the model store; and
   selectively applying the application update related to the selected model store based on selection of the application update related to the selected model store and selection of the model store.

2. The method of claim 1, further comprising identifying particular environmental information of the customized system.

3. The method of claim 2, wherein the particular environmental information includes an indication of a production environment.

4. The method of claim 2, wherein the particular environmental information includes an indication of a test environment.

5. The method of claim 1, wherein the contextual information includes information about hardware upon which the customized system operates.

6. The method of claim 1, wherein the contextual information includes locality information.

7. The method of claim 1, further comprising performing an impact analysis to determine conflicts relative to the selected application update related to the selected model store and the selected model store.

8. A custom computing system comprising:
   a processor;
   a storage device coupled to the processor and configured to store code, which when executed by the processor, causes the processor to execute a customized function, wherein the customized function includes a change from an as-shipped version of the customized function;
   an input component coupled to the processor and configured to receive a user input;
   a user interface component coupled to the processor and configured to generate a user interface;
   a data store storing data indicative of organization processes and workflows; and
   an update installer interface configured to communicate with a remote device to obtain a potential update;
   wherein the user interface component is configured to display an update type selection user interface to receive a user input selection of one of a plurality of update types;
   wherein the user interface component is further configured to display a model store selection user interface to receive a user input selection of a model store after obtaining the potential update;
   wherein the user interface component is further configured to display an application update selection user interface to receive a user input selection of an application update related to the selected model store after receiving the user input selection of the model store; and
   wherein the custom computing system is configured to obtain contextual information about the custom computing system and selectively apply the application update related to the selected model store to the custom computing system based on the user input selection of the application update related to the selected model store and the user input selection of the model store, and wherein the application update related to the selected model store is received from the remote device through the update installer interface prior to receiving the user input selection of the model store.

9. The custom computing system of claim 8, wherein the user interface component is further configured to present an element that, when selected by a user, will cause the custom computing system to download an installer component from the remote device.

10. The custom computing system of claim 8, wherein the user interface component is further configured to present an authentication interface.

11. The custom computing system of claim 8, wherein the one of the plurality of update types includes a binary update type.

12. The custom computing system of claim 8, wherein the one of the plurality of update types includes an application update type.

13. The custom computing system of claim 8, wherein the user interface component is further configured to present a user interface element that allows a user to select less than all of a plurality of application updates for installation.

14. The custom computing system of claim 13, further comprising an impact analysis module configured to determine conflicts relative to the user selected less than all of the plurality of application updates and the user input selection of the model store.

15. The custom computing system of claim 13, wherein the user interface component is further configured to provide a user interface element that allows the user to save a custom update package.

16. The custom computing system of claim 15, wherein the user interface component is further configured to provide a user interface element that allows the user to load the custom update package for installation.

* * * * *